US011821747B2

(12) United States Patent
Baig et al.

(10) Patent No.: US 11,821,747 B2
(45) Date of Patent: Nov. 21, 2023

(54) DISPLAYING PERSONALIZED LANDMARKS IN A MAPPING APPLICATION

(71) Applicant: GOOGLE LLC, Mountain View, CA (US)

(72) Inventors: Haroon Baig, Mountain View, CA (US); Ankit Gupta, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/488,513

(22) PCT Filed: Sep. 6, 2018

(86) PCT No.: PCT/US2018/049664
§ 371 (c)(1),
(2) Date: Aug. 23, 2019

(87) PCT Pub. No.: WO2020/050842
PCT Pub. Date: Mar. 12, 2020

(65) Prior Publication Data
US 2021/0364311 A1     Nov. 25, 2021

(51) Int. Cl.
*G01C 21/36* (2006.01)
(52) U.S. Cl.
CPC ..... *G01C 21/3644* (2013.01); *G01C 21/3641* (2013.01); *G01C 21/3682* (2013.01)
(58) Field of Classification Search
CPC ................................................ G01C 21/3644
See application file for complete search history.

(56) References Cited

U.S. PATENT DOCUMENTS 6,339,746 B1 *   1/2002   Sugiyama ............... G08G 1/005
                                                                  701/25
7,831,387 B2    11/2010   Golding et al.
(Continued)

FOREIGN PATENT DOCUMENTS

AU       2010218372 B2 *   2/2010
CN       101650192 A        2/2010
(Continued)

OTHER PUBLICATIONS

Machine Translation for CN107787459B (Jul. 5, 2015).*
(Continued)

*Primary Examiner* — Jean Paul Cass
(74) *Attorney, Agent, or Firm* — MARSHALL, GERSTEIN & BORUN LLP

(57) ABSTRACT

To provide personalized data for display on a map, a server device obtains location data for a user and identifies locations that are familiar to the user based on the frequency and recency in which the user visits the locations. The server device then provides the familiar locations in search results/suggestions and annotates the familiar locations with a description of a relationship between the familiar location and the user. The server device also includes the familiar locations as landmarks for performing maneuvers in a set of navigation instructions. Furthermore, the server device provides a familiar location as a frame of reference on a map display when a user selects another location nearby the familiar location. Moreover, the server device includes a familiar location as an intermediate destination when the user request navigation directions to a final destination.

19 Claims, 13 Drawing Sheets

(56) References Cited

U.S. PATENT DOCUMENTS

| | | | |
|---|---|---|---|
| 8,103,445 B2 | 1/2012 | Smith et al. | |
| 8,306,749 B1 | 11/2012 | Petersen et al. | |
| 8,396,287 B2* | 3/2013 | Adam | G06F 16/50 |
| | | | 707/711 |
| 8,498,788 B2 | 7/2013 | Kondekar | |
| 9,644,969 B2 | 5/2017 | Koenig et al. | |
| 10,045,159 B2* | 8/2018 | Chao | G06Q 10/06 |
| 10,495,463 B2* | 12/2019 | Basson | G01C 21/34 |
| 10,900,793 B2* | 1/2021 | Jung | G06V 20/588 |
| 2002/0072848 A1* | 6/2002 | Hamada | G01C 21/3644 |
| | | | 701/431 |
| 2005/0041684 A1* | 2/2005 | Reynolds | H04L 43/00 |
| | | | 370/463 |
| 2006/0069503 A1 | 3/2006 | Suomela et al. | |
| 2007/0214970 A1* | 9/2007 | Taylor | B30B 9/3082 |
| | | | 100/88 |
| 2009/0143984 A1 | 6/2009 | Baudisch et al. | |
| 2009/0276151 A1* | 11/2009 | Bucchieri | G01C 21/3647 |
| | | | 701/423 |
| 2010/0168994 A1 | 7/2010 | Bourque et al. | |
| 2011/0098910 A1 | 4/2011 | Saarimaki et al. | |
| 2013/0035853 A1 | 2/2013 | Stout et al. | |
| 2013/0147661 A1* | 6/2013 | Kangas | G01S 19/41 |
| | | | 342/357.23 |
| 2013/0217333 A1* | 8/2013 | Sprigg | G06Q 30/02 |
| | | | 455/41.2 |
| 2015/0278211 A1 | 10/2015 | Voronel | |
| 2016/0012050 A1 | 1/2016 | Bursey et al. | |
| 2016/0076902 A1 | 3/2016 | Diaz et al. | |
| 2016/0076903 A1 | 3/2016 | Diaz et al. | |
| 2017/0006430 A1 | 1/2017 | Chao et al. | |
| 2017/0314954 A1 | 11/2017 | Golding et al. | |
| 2017/0329780 A1 | 11/2017 | Salowitz | |
| 2017/0350719 A1 | 12/2017 | Moore et al. | |
| 2018/0112993 A1 | 4/2018 | Schpok | |
| 2019/0224049 A1* | 7/2019 | Creasy | G06F 3/167 |
| 2020/0356155 A1* | 11/2020 | Vaccari | G06F 16/5866 |

FOREIGN PATENT DOCUMENTS

| | | |
|---|---|---|
| CN | 102980587 A | 3/2013 |
| CN | 106461412 A | 2/2017 |
| CN | 106687767 A | 5/2017 |
| EP | 2 607 852 A2 | 6/2013 |
| JP | H11-160088 A | 6/1999 |
| JP | 2004-144721 A | 5/2004 |
| JP | 2008-070377 A | 3/2008 |
| JP | 2011-512529 A | 4/2011 |
| JP | 2012-037333 A | 2/2012 |
| JP | 2014-190952 A | 10/2014 |
| JP | 2016-170270 A | 9/2016 |
| WO | WO-2010/052866 A1 | 5/2010 |
| WO | WO-2012/157027 A1 | 11/2012 |
| WO | WO-2017/212355 A1 | 12/2017 |

OTHER PUBLICATIONS

Lim, Kwan, Springer, Personalized trip recommendation for tourists based on user interests, points of interest visit durations and visit recency, Knowledge and Information Systems vol. 54, pp. 375-406 (https://link.springer.com/article/10.1007/s10115-017-1056-y) (published on May 7, 17) (Year: 2017).*

Harsur, et al, "Voice Based Navigation System for Blind People Using Ultrasonic Sensor," "International Journal on Recent annd Innovation Trends in Computing annd Communication", vol. 3, Issue 6, Jun. 2015.

NationTruck Motorbike Navigation (http://store.naviontruck.com/).

Search Report for International application No. PCT/US2018/049661, dated Jul. 10, 2019.

Written Opinion for International application No. PCT/US2018/049661, dated Jul. 10, 2019.

Search Report for International application No. PCT/US2018/049664, dated Aug. 5, 2019.

Written Opinion for International application No. PCT/US2018/049664, dated Aug. 5, 2019.

First Examination Report for India Application No. 202047052925, dated Dec. 14, 2021.

Office Action for Korean Application No. 1-2020-7035932, dated May 30, 2022.

Notice of Reasons for Rejection for Japanese Application No. 2020-567966, dated Aug. 29, 2022.

Office Action for Indian Patent Application No. 202248021437, dated Nov. 21, 2022.

Office Action for Indian Patent Application No. 202248021446, dated Nov. 21, 2022.

Office Action for Korean Application No. 10-2020-7035932, dated Dec. 7, 2022.

Extended European Search Report for Application No. 1212250.1, dated Mar. 21, 2022.

Extended European Search Report for Application No. 21212246.9, dated Mar. 22, 2022.

First Office Action for Chinese Application No. 201880095189.3, dated Aug. 25, 2023.

* cited by examiner

200

| 202 | 204 | 206 | 208 | 210 | 212 |
|---|---|---|---|---|---|
| User ID | Location | Date | Time | Time Spent at Location | Location Label |
| 11111 | Starbucks | 7/11/2018 | 8 p.m. | 5 minutes | None |
| 11111 | McDonalds | 7/3/2018 | 9 a.m. | 30 minutes | None |
| 11111 | 123 Main Street | 6/14/2018 | 3 p.m. | 4 hours | Work |
| 11111 | 326 Hillcrest Drive | 6/13/2018 | 6 p.m. | 2 hours | Bill's House |
| 11111 | Starbucks | 6/12/2018 | 10 a.m. | 15 minutes | None |

| 252 | 254 | 256 | 258 | 260 | 262 |
|---|---|---|---|---|---|
| User ID | Location | Location Label | Frequency Score | Recency Score | Overall Score |
| 11111 | Starbucks | None | 60 | 70 | 62 |
| 11111 | McDonalds | None | 45 | 65 | 51 |
| 11111 | 123 Main Street | Work | 76 | 50 | 70 |
| 11111 | 326 Hillcrest Drive | Bill's House | 54 | 48 | 52 |

DISPLAYING PERSONALIZED LANDMARKS IN A MAPPING APPLICATION

FIELD OF THE DISCLOSURE

The present disclosure relates to personalization in geographic applications and, more particularly, to identifying familiar locations to a user and presenting navigation directions, search results, or a selected location on a map display using the familiar locations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, digital maps of geographic areas are displayed on computing devices, such as computers, tablets, and mobile phones via mapping applications, web browsers, etc. Many mapping applications display points of interest (POIs), such as businesses or other organizations on the map. Each POI may be displayed using an icon or other indicator of the type of POI (e.g., a restaurant symbol for restaurants, a shopping symbol for department stores, etc.). Furthermore, the mapping applications, web browsers, etc. provide geographic search results (e.g., POIs) in response to geographic search queries and present one or several of the geographic search results within the digital map using an icon or other indicator.

Additionally, software applications executing in computers, smartphones, etc. or embedded devices generate step-by-step navigation directions. Typically, a user specifies the starting point and the destination, and a software application displays the directions immediately and/or as the user travels from the starting point and the destination.

These software applications generally utilize indications of distance, street names, building numbers, to generate navigation directions based on the route. For example, these systems can provide to a driver such instructions as "proceed for one-fourth of a mile, then turn right onto Maple Street." However, it is difficult for drivers to accurately judge distance, and it is not always easy for drivers to see street signs. Moreover, there are geographic areas where street and road signage is poor.

To provide guidance to a driver that is more similar to what another person may say to the driver, it is possible to augment navigation directions with references to POIs (also referred to herein as "landmarks") along the route, such as visually salient buildings or billboards. Additionally, it is also possible to present the landmarks to orient a user within a digital map, or to provide geographic search results in response to a geographic search query (e.g., "Bars in Zurich"). However, the number of landmarks which are well-known to the general public is limited, and software applications may not always be able to present a landmark when orienting or navigating the user.

SUMMARY

To expand the number of available landmarks to include in navigation directions or when orienting a user, a personalized map data generation system obtains a location history for the user when the user gives permission for the system to obtain location data. The location history may include information regarding POIs previously visited by the user, such as the location of the POI or landmark, the date and time in which the user visited the landmark, the amount of time spent at the landmark, a label for the landmark provided by the user such as "Home," "Work," "John's House," "Favorite Restaurant," etc.

When the user selects a location or POI presented by the mapping application, the personalized map data generation system identifies landmarks in the user's location history that are near the selected location. One of the landmarks then is selected based on the frequency and/or recency with which the user visited the landmark. Then the mapping application presents the selected landmark with the selected location on a map display to provide the user with a frame of reference for the selected location.

In another scenario, the user requests navigation directions from a starting location such as the user's current location to a destination location. As a result, the personalized map data generation system generates a set of navigation instructions, where each instruction includes a maneuver (e.g., "Turn right") at a particular waypoint along the route. For at least some of the instructions, a landmark nearby the particular waypoint is selected as a frame of reference for the maneuver based on the frequency and/or recency in which the user visited the landmark (e.g., "Turn right at the intersection after passing Bob's House"). Then the mapping application presents the set of navigation instructions to the user referencing the selected landmarks.

In yet another scenario, the user provides a geographic search query or a partial geographic search query to the mapping application. Accordingly, the personalized map data generation system generates a set of search results relevant to the geographic search query and may rank the set of search results. Moreover, the personalized map data generation system identifies search results corresponding to POIs in the user's location history and boosts the rankings of search results based on the frequency and/or recency in which the user visited the corresponding POI. For example, a search result for a POI visited by the user several times where the most recent time was the previous day may be boosted several spots in the rankings, whereas a search result for a POI visited once by the user over a month ago may be boosted only a few spots or, in another implementation or scenario, not at all. The personalized map data generation system also may annotate the search results with a description of the relationship between the POI and the user, such as a description of how frequently the user visits the POI, a description of the most recent time the user visited the POI, etc. Then the mapping application presents the annotated search results to the user in a ranked order.

In addition to providing turn-by-turn navigation directions with familiar landmarks as frames of reference for some of the maneuvers, the personalized map data generation system may identify a familiar location as an intermediate destination in response to a request for navigation directions to a final destination. The intermediate destination in some cases is disposed not along the direct route from the starting location to the final destination but at some distance X away from the nearest point on the route. However, the intermediate destination may be a landmark with which the user is very familiar and/or to which the user travelled many times in the past. In this manner, the personalized map data generation system may significantly reduce the amount of navigation instructions provided to the user by refraining from sending navigation directions, or providing only sparse navigation directions, until the user approaches the intermediate destination or a waypoint which the routes to the actual destination and intermediate destination share. At this point, the personalized map data generation system may "take over" and provide a set of navigation instructions from the intermediate destination or the common waypoint to the final destination. Thus, the personalized map data generation system in some cases combines guidance that references a familiar location and thus feels intuitive to the user with step-by-step guidance for the remainder of the route.

One example embodiment of the techniques of this disclosure is a method for providing a personalized landmark on a digital map to locate a geographic search result. The method includes receiving a selection of a point of interest within a digital map presented on a portable device of a user, obtaining a location history for the user, and identifying a plurality of candidate landmarks within a threshold distance of the selected point of interest. The method further includes selecting one of the plurality of candidate landmarks based on at least one of (i) a frequency in which the user has visited the candidate landmark or (ii) an amount of time since the user most recently visited the candidate landmark according to the location history, and causing an indicator representing the selected landmark and an indicator represented the selected point of interest to be presented within the digital map.

Another example embodiment is a method for providing navigation directions using personalized landmarks. The method includes receiving a request for navigation directions for a user of a portable device from a starting location to a destination location, and generating a set of navigation instructions to the destination location, each navigation instruction in the set including a maneuver at a particular location. For at least one navigation instruction in the set, the method includes obtaining a location history for the user, selecting a navigation landmark within a threshold distance of the particular location for the maneuver, the navigation landmark selected based on at least one of at least one of (i) a frequency in which the user has visited the navigation landmark or (ii) an amount of time since the user most recently visited the navigation landmark according to the location history, and generating the navigation instruction referencing the selected navigation landmark. The method further includes causing the set of navigation instructions to be provided via a user interface of the portable device.

Yet another example embodiment is a method for providing search suggestions based on familiarity to a user. The method includes receiving a geographic search query from a user of a portable device, obtaining a location history for the user, and identifying a set of search results in response to the geographic search query, the set of search results including at least one point of interest that has previously been visited by the user according to the location history. The method further includes causing the set of search results to be provided via a user interface of the portable device, where the set of search results are annotated with a description of a relationship between the point of interest and the user according to the location history.

Another example embodiment is a method for providing navigation directions using a familiar location to a user as an intermediate destination. The method includes receiving a request for navigation directions for a user from a starting location to a final destination location, identifying an intermediate destination location selected based on familiarity to the user, and providing a first navigation instruction directing the user to travel toward the intermediate destination location. In response to determining that the user is approaching the intermediate destination location or at a particular waypoint along a route toward the intermediate destination location, the method includes providing a set of navigation instructions which direct the user to the final destination location.

Yet another example embodiment is a computing device for providing navigation directions using a familiar location to a user as an intermediate destination, where the computing device includes one or more processors and a non-transitory computer-readable memory coupled to the one or more processors and storing thereon instructions. The instructions, when executed by the one or more processors, cause the computing device to receive a request for navigation directions for a user from a starting location to a final destination location, identify an intermediate destination location selected based on familiarity to the user, and provide a first navigation instruction directing the user to travel toward the intermediate destination location. In response to determining that the user is approaching the intermediate destination location or at a particular waypoint along a route toward the intermediate destination location, the instructions cause the computing device to provide a set of navigation instructions which direct the user to the final destination location.

Another example embodiment is a non-transitory computer-readable medium storing instructions for providing navigation directions using a familiar location to a user as an intermediate destination. The non-transitory computer-readable memory is coupled to one or more processors in a computing device and storing thereon instructions. The instructions, when executed by the one or more processors, cause the one or more processors to receive a request for navigation directions for a user from a starting location to a final destination location, identify an intermediate destination location selected based on familiarity to the user, and provide a first navigation instruction directing the user to travel toward the intermediate destination location. In response to determining that the user is approaching the intermediate destination location or at a particular waypoint along a route toward the intermediate destination location, the instructions cause the one or more processors to provide a set of navigation instructions which direct the user to the final destination location.

BRIEF DESCRIPTION OF THE DRAWINGS

FIG. 2A is an example data table of user location data which the personalized map data generation system of FIG. 1 can utilize to score landmarks for determining which landmarks to present on a digital map;

FIG. 2B is an example data table which the personalized map data generation system of FIG. 1 can utilize to rank the landmarks based on corresponding scores to determine which landmarks to present on the digital map;

DETAILED DESCRIPTION

Overview

Figure 1:
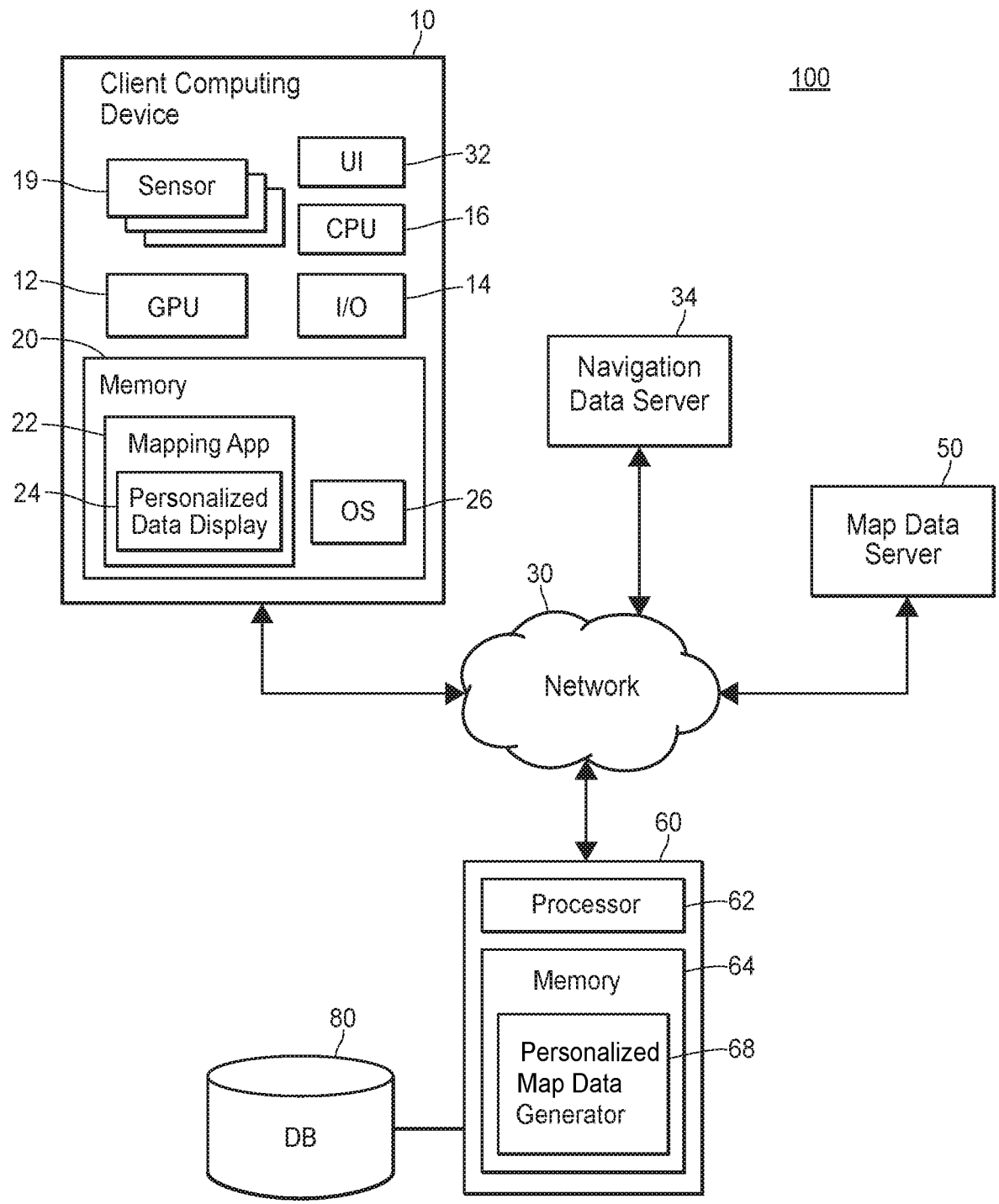
FIG. 1 is a block diagram of an example system in which techniques for generating personalized map data can be implemented.

The present disclosure describes a system for generating navigation directions more efficiently by referencing one or more intermediate locations selected based on familiarity to the user or another suitable criterion.

The subject matter described in this specification can be implemented in particular embodiments so as to realize one or more of the following advantages. A user is likely to know the directions to particular locations with which she is already familiar. Accordingly, the methods and systems described herein direct the user to travel toward an intermediate destination location familiar to the user before directing the user to the final destination location. By making use of an intermediate destination location that is likely to be known to the user, the number of required navigation instructions can be reduced, thereby reducing computing and transmission overhead and thus improving the efficiency of the system. Furthermore, the navigation instructions can be personalized for the user, thereby making these instructions more effective for directing the user to the final destination location.

The above advantages are embodied in a number of potential applications. In a first embodiment, a personalized landmark is provided on a digital map to help the user locate a nearby geographic result within the map. The landmark may be selected based on a frequency in which the user has visited the landmark and/or an amount of time since the user most recently visited the landmark. This allows the user to more effectively locate the geographic result by providing a nearby known point of reference. In addition, this can help avoid the presentation of superfluous information (such as a generic landmark that may not be known to the user), thereby improving the efficiency of the system. In addition, the location history can be used to annotate the landmark with details of the user's history with the location to help provide further context to the user.

In a second embodiment, navigation directions are improved via the use of personalized landmarks. As with the first embodiment, the personalized landmark may be selected based on a frequency in which the user has visited the landmark and/or an amount of time since the user most recently visited the landmark. In contrast to the first embodiment, the personalized landmark may also be selected based on it being located nearby (within a predefined distance of) a location at which a maneuver from the navigation instructions is to take place. The associated navigation instruction can therefore be modified to reference the landmark. This provides improved navigation instructions that are more relevant to the user and therefore more effective at directing the user to her desired location.

In a third embodiment, search suggestions in response to a search query are improved through the identification of a point of interest that has been visited by the user according to the user's location history. The search results may be annotated to include a description of a relationship between the point of interest and the user to provide further context to the result, thereby helping the user to better recognize the point of interest within the search results. The point of interest may be preferentially included within the search results (e.g., moved to a more prominent position within the search results) on the basis that it is likely to be more useful to the user than other search results. By identifying and annotating points of interest within a set of search results, the system provides a more useful set of search results. This reduces the likelihood of the user performing further searches and therefore improves the efficiency of the overall system.

The search query received from the user may be a partial geographic search query. In this regard, the search query may be a partly typed geographic search query (e.g., an initial subset of characters from a full geographic search query being input by the user). This allows the system to predict and suggest appropriate search results even before the user has finished inputting the search query, potentially speeding up the searching process for the user.

The term "landmark" discussed herein need not refer to a location that is well known to the general population, but instead may refer to a location that is deemed to be known to the user in view of the user's location history (e.g., due to the user previously visiting the location).

Example Hardware and Software Components

Referring to FIG. 1, an example communication system 100 in which a personalized map data generation system can be implemented includes a client computing device 10 configured to execute a geographic application 22, which also can be referred to as "mapping application 22." Depending on the implementation, the application 22 can display an interactive digital map, request and receive routing data to provide driving, walking, or other navigation directions, provide various geolocated content, etc. The client computing device 10 may be operated by a user displaying a digital map while navigating to various locations.

In addition to the client computing device 10, the communication system 100 includes a server device 60 configured to identify landmarks familiar to the user based on the user's location history and provide personalized map data to the client computing device 10, such as navigation directions including familiar landmarks as frames of reference for maneuvers or as an intermediate destination on the way to a final destination, a map display of a selected location including a nearby familiar landmark, search results/suggestions including familiar landmarks, etc. The server device 60 can be communicatively coupled to a database 80 that stores, in an example implementation, location data for the user. The location data is described in more detail below with reference to FIGS. 2A and 2B.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. The devices operating in the communication system 100 can be interconnected via a communication network 30.

In various implementations, the client computing device 10 may be a smartphone or a tablet computer. The client computing device 10 may include a memory 20, one or more processors (CPUs) 16, a graphics processing unit (GPU) 12, an I/O module 14, a user interface (UI) 32, and one or several sensors 19 including a Global Positioning Service (GPS) module. The memory 20 can be a non-transitory memory and can include one or several suitable memory modules, such as random access memory (RAM), read-only memory (ROM), flash memory, other types of persistent memory, etc. The I/O module 14 may be a touch screen, for example. In various implementations, the client computing device 10 can include fewer components than illustrated in FIG. 1 or conversely, additional components. In other embodiments, the client computing device 10 may be any suitable portable or non-portable computing device. For example, the client computing device 10 may be a laptop computer, a desktop computer, a wearable device such as a smart watch or smart glasses, etc.

The memory 20 stores an operating system (OS) 26, which can be any type of suitable mobile or general-purpose operating system. The OS 26 can include application programming interface (API) functions that allow applications to retrieve sensor readings. For example, a software application configured to execute on the computing device 10 can include instructions that invoke an OS 26 API for retrieving a current location of the client computing device 10 at that instant. The API can also return a quantitative indication of how certain the API is of the estimate (e.g., as a percentage).

The memory 20 also stores a mapping application 22, which is configured to generate interactive digital maps and/or perform other geographic functions, as indicated above. The mapping application 22 can receive map data in a raster (e.g., bitmap) or non-raster (e.g., vector graphics) format from the map data server 50 and present the map data via the personalized data display 24. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The mapping application 22 also can display driving, walking, or transit directions, and in general provide functions related to geography, geolocation, navigation, etc. via the personalized data display 24.

It is noted that although FIG. 1 illustrates the mapping application 22 as a standalone application, the functionality of the mapping application 22 also can be provided in the form of an online service accessible via a web browser executing on the client computing device 10, as a plug-in or extension for another software application executing on the client computing device 10, etc. The mapping application 22 generally can be provided in different versions for different respective operating systems. For example, the maker of the client computing device 10 can provide a Software Development Kit (SDK) including the mapping application 22 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a personalized map data generator 68, which can identify candidate landmarks, rank and score the candidate landmarks based on the frequency and/or recency in which the user visited the candidate landmark, and select one or several of the highest ranking candidate landmarks to include in a map display and/or navigation directions presented on the map display. The personalized map data generator may also boost the rankings of search results based on the frequency and/or recency in which the user visited the POIs corresponding to the search results. The personalized map data generator may then provide map data, navigation data, and/or search results including the familiar landmarks for display by the personalized data display 24 of the client computing device 10.

The personalized map data generator 68 and the personalized data display 24 can operate as components of a personalized map data generation system. Alternatively, the personalized map data generation system can include only server-side components and simply provide the personalized data display 24 with instructions to display personalized map data. In other words, personalized map data generation techniques in these embodiments can be implemented transparently to the personalized data display 24. As another alternative, the entire functionality of the personalized map data generator 68 can be implemented in the personalized data display 24.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the client computing device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the personalized data display 24 operating in the client computing device 10 receives and transmits data to the server device 60. Thus, in one example, the client computing device 10 may transmit location data to the personalized map data generator 68 (implemented in the server device 60) when the user selects a user control providing permission to the mapping application 22 to share the location data. The location data may include the name or address of a location visited by a user according to a check-in at the location or positioning data from the sensors 19, the date and time at which the user visited the location, the amount of time in which the user visited the location, and/or a label for the location provided by the user, such as "Bob's House" for 123 Hauptstrasse in Zurich, Switzerland. In some embodiments, the personalized data display 24 provides location data when the client computing device 10 is at a location for more than a threshold time period (e.g., 1 minute). In this manner, the personalized data display 24 does not identify locations that the user passes by on her way to a destination.

In another example, the client computing device 10 may transmit communications to the personalized map data generator 68 requesting navigation directions, map data for a selected location, search results/suggestions, etc. Accordingly, the personalized map data generator 68 may communicate with the navigation data server 34, the map data server 50, and/or any other suitable server to retrieve the requested navigation directions, map data for the selected location, or search results/suggestions. Additionally, the personalized map data generator 68 obtains location data for the user of the client computing device 10 for example, from a location data table 200 stored in the database 80 as shown in FIG. 2A. The location data 200 may include a user identifier (user ID) 202 for a user of a client computing device 10. The location data 200 may also include the name or address 204 of a location visited by a user for more than a threshold amount of time (e.g., 1 minute). Furthermore, the location data 200 may include the date 206 and time 208 of the visit, the amount of time spent at the location 210, and a location label 212 indicating a name provided by the user for the location, such as "Parents' House," "Work," "Favorite Restaurant," etc. For example, the first entry of the data table 200 indicates that the user visited the Starbucks® 204 on 789 Hauptstrasse in Zurich at 8 p.m. on Jul. 11, 2018 for 5 minutes and did not provide a label for the Starbucks®.

The personalized map data generator 68 assigns one or more scores to each location 204 in the location data table 200 including a frequency score 258, a recency score 260, and an overall score 262 as shown in the data table 250 depicted in FIG. 2B. The frequency score 258 may be determined based on the total number of times the user has visited the location, the number of times the user has visited the location within a threshold time period (e.g., the previous month), the average rate in which the user visits the location (e.g., three times per month, twice a year, etc.), or in any other suitable manner. For example, the location data table 200 indicates the user has visited the Starbucks® on 789 Hauptstrasse in Zurich twice since Jun. 12, 2018. In some embodiments, the personalized map data generator 68 may factor the amount of time spent at the location 210 into the frequency score 258, because the user may be more familiar with a location that she spent significant time in compared with a location she left quickly. For example, visits for less than a threshold amount of time (e.g., 5 minutes) may not be included in the number of times the user has visited the location. In another example, the frequency score 258 may be determined based on a weighted number of times the user has visited the location, where visits are assigned higher weights the longer the user stays at the location.

The recency score 260 may be determined based on the amount of time since the user last visited the location or the amount of time since the user visited the location at a rate above a frequency threshold. For example, if the user previously visited the location once a week for several months but now only visits the location once a year, the recency score 260 may be based on the amount of time since the user last visited the location once a week. In some embodiments, the personalized map data generator 68 may factor the amount of time spent at the location 210 into the recency score 260. For example, visits for less than a threshold amount of time (e.g., 5 minutes) may not be included as the most recent time in which the user has visited the location.

The overall score 262 may be determined based on any suitable combination of the frequency 258 and recency scores 260. In some embodiments, the personalized map data generator 68 aggregates the frequency 258 and recency scores 260 to generate the overall score 262, averages the frequency 258 and recency scores 260 to generate the overall score 262, or multiplies the frequency 258 and recency scores 260 to generate the overall score 262. In other embodiments, the personalized map data generator 68 assigns weights to each of the frequency 258 and recency scores 260 and calculates a weighted combination of the frequency 258 and recency scores 260 to generate the overall score 262. For example, the personalized map data generator 68 may assign a weight of 0.6 to the frequency score 258, a weight of 0.4 to the recency score 260, and may calculate a weighted average of the scores.

In response to receiving a request for navigation directions and a subsequent set of navigation instructions including maneuvers at various waypoints along a route from the navigation data server 34, the personalized map data generator 68 identifies locations 204 in the location data table 200 within a threshold distance of each waypoint as candidate landmarks. Then the personalized map data generator 68 obtains the overall scores 262 for the candidate landmarks and ranks the candidate landmarks according to the overall scores 262. In some embodiments, when a candidate landmark is ranked above a threshold ranking or has a score above a threshold score, the personalized map data generator 68 selects the candidate landmark to include in the navigation instruction for the corresponding maneuver. For example, when the maneuver is to turn right at a waypoint within a threshold distance of Bill's House, and Bill's House has an overall score above a threshold score, the personalized map data generator 68 generates the instruction, "Turn right at the intersection past Bill's House," or "Turn right at the intersection before Bill's House." In other embodiments, the personalized map data generator 68 identifies candidate landmarks within a threshold distance of each waypoint, ranks the candidate landmarks corresponding to a particular waypoint, and selects the highest ranking candidate landmark for the particular waypoint to include in the navigation instruction.

In some scenarios, the personalized map data generator 68 only selects the highest ranking candidate landmark for the particular waypoint to include in the navigation instruction when the highest ranking candidate landmark has a minimum score above a threshold score. Otherwise, the personalized map data generator 68 uses the default navigation instruction, such as "Turn right onto Main St." In other scenarios, the personalized map data generator 68 selects a maximum threshold number of landmarks to include in the navigation instructions (e.g., 3). Accordingly, the personalized map data generator 68 selects the highest ranking candidate landmarks for different waypoints not to exceed the maximum threshold number. For example, if the maximum threshold number is three and the second and third ranked candidate landmarks are for the same waypoint, the personalized map data generator 68 selects the first and second ranked candidate landmarks and the fourth ranked candidate landmark to include in the navigation instructions. In any event, the personalized map data generator 68 provides the set of navigation instructions including the selected landmarks to the user's client computing device 10 for presentation via the personalized data display 24.

In response to receiving a selection of a location and subsequent map data for the selected location from the map data server 50, the personalized map data generator 68 identifies locations 204 in the location data table 200 within a threshold distance of the selected location as candidate landmarks. Then the personalized map data generator 68 obtains the overall scores 262 for the candidate landmarks and ranks the candidate landmarks according to the overall scores 262. The personalized map data generator 68 selects the highest ranking candidate landmark, and provides the map data including an indication of the selected location and an indication of the selected landmark to the user's client computing device 10 for presentation via the personalized data display 24. In response, the personalized data display 24 presents a map display of a geographic area including the selected location and the selected landmark along with indications of the selected location and the selected landmark, such as pins or other icons representing the selected location and the selected landmark. In some embodiments, the personalized map data generator 68 generates a description of the relationship between the selected landmark and the user, such as a description of the frequency in which the user visited the landmark (e.g., "You come here often"), or a description of the recency in which the user visited the landmark (e.g., "You were here last week"). The personalized map data generator 68 then causes the map display to be annotated with the description of the relationship between the selected landmark and the user.

In response to receiving a geographic search query and subsequent search results along with scores/rankings for the search results from the map data server 50 in response to the geographic search query, the personalized map data generator 68 identifies locations 204 in the location data table 200 that are included in the search results. Then the personalized map data generator 68 annotates the search results for locations included in the user's location history with a description of the relationship between the location and the user, such as a description of the frequency in which the user visited the location (e.g., "You come here often"), or a description of the recency in which the user visited the location (e.g., "You were here last week"). Additionally, in some embodiments, the personalized map data generator 68 adjusts the scoring/ranking of the search results for example, by boosting the rankings and/or increasing scores for search results for locations that have previously been visited by the user.

More specifically, the personalized map data generator 68 may obtain relevancy scores for each of the search results generated by the map data server 50. In addition to the relevancy scores, the personalized map data generator 68 obtains frequency scores 258, recency scores 260, and/or overall scores 262 from the data table 250 depicted in FIG. 2B for locations previously visited by the user. For locations that have not been previously visited by the user, the personalized map data generator 68 may assign a default overall score of 0 to the locations or another default score.

In any event, for each search result, the personalized map data generator 68 combines the relevancy score, the frequency score 258, and the recency score 260 to generate a boosted search result score. The personalized map data generator 68 then re-ranks the search results according to the boosted search result scores, and provides the re-ranked search results along with respective annotations to the user's client computing device 10 for presentation via the personalized data display 24.

In another embodiment, in response to receiving a request for navigation directions from a starting location (e.g., the user's current location) to a final destination and a subsequent set of navigation instructions including maneuvers at various waypoints along a route from the navigation data server 34, the personalized map data generator 68 identifies locations 204 in the location data table 200 within a threshold distance of the final destination as candidate intermediate destinations. The personalized map data generator 68 may also identify locations 204 in the location data table 200 within a threshold distance of each waypoint as candidate intermediate destinations. Furthermore, the personalized map data generator 68 may identify locations 204 as candidate intermediate destinations having a second route from the starting location to the candidate intermediate destination that intersects with a first route from the starting location to the final destination. More specifically, the candidate intermediate destinations may include locations 204 having a common waypoint along the second route from the starting location to the candidate intermediate destination with one of the waypoints along the first route from the starting location to the final destination.

In some embodiments, the personalized map data generator 68 selects a candidate intermediate destination when the frequency in which the user has visited the candidate intermediate destination location is greater than a threshold frequency or the amount of time since the user most recently visited the candidate intermediate destination location is less than a threshold amount of time.

In other embodiments, the personalized map data generator 68 obtains the overall scores 262 for the candidate intermediate destinations and ranks the candidate intermediate destinations according to the overall scores 262. In yet other embodiments, the personalized map data generator 68 obtains the frequency 258 and recency 260 scores for the candidate intermediate destinations. The personalized map data generator 68 also assigns a distance score to each candidate intermediate destination based on the distance from the candidate intermediate destination to the final destination, the distance to the final destination from the common waypoint along the route to the candidate intermediate destination, and/or a distance to the candidate intermediate destination from the nearest waypoint along the route from the starting location to the final destination.

In some scenarios, the distance score may be inversely related to the distance to the final destination, such that the distance score increases as the distance to the final destination decreases. Also in some scenarios, the distance scores may be tiered such that distance scores based on the distance from the candidate intermediate destination to the final destination may be placed in a first tier. Distance scores based on the distance to the final destination from the common waypoint along the route to the candidate intermediate destination may be placed in a second tier. Furthermore, distance scores based on the distance to the candidate intermediate destination from the nearest waypoint along the route from the starting location to the final destination may be placed in a third tier. The first tier distance scores may each be higher than the second tier distance scores, the second tier distance scores may each be higher than the third tier distance scores, and so on.

In any event, the personalized map data generator 68 combines the frequency 258, recency 260, and distance scores in any suitable manner to generate an intermediate destination score. Then the personalized map data generator 68 ranks the candidate intermediate destinations according to the intermediate destination score.

In some embodiments, the personalized map data generator 68 aggregates the frequency 258, recency 260, and distance scores to generate the intermediate destination score, averages the frequency 258, recency 260, and distance scores to generate the intermediate destination score, or multiplies the frequency 258, recency 260, and distance scores to generate the intermediate destination score. In other embodiments, the personalized map data generator 68 assigns weights to each of the frequency 258, recency 260, and distance scores and calculates a weighted combination of the frequency 258, recency 260, and distance scores to generate the intermediate destination score. For example, the personalized map data generator 68 may assign a weight of 0.4 to the frequency score 258, a weight of 0.4 to the recency score 260, and a weight of 0.2 to the distance score and may calculate a weighted average of the scores.

In any event, the personalized map data generator 68 selects the highest ranking candidate intermediate destination, and does not provide turn-by-turn navigation instructions from the starting location to the selected intermediate destination. Instead, the personalized map data generator 68 provides a first navigation instruction for the user to travel to the selected intermediate destination to the user's client computing device 10 for presentation via the personalized data display 24. The personalized map data generator 68 also may obtain navigation directions to the final destination from the selected intermediate destination or from a waypoint along the route to the selected intermediate destination that is in common with a waypoint along the route to the final destination. Then the personalized map data generator 68 provides the navigation directions to the final destination to the user's client computing device 10. In turn, the personalized data display 24 presents the navigation directions to the final destination in response to determining, via the sensors 19, that the client computing device 10 is approaching the selected intermediate destination or the common waypoint along the route to the selected intermediate destination.

Example Location Display with Familiar Landmark as Frame of Reference

Figure 3:
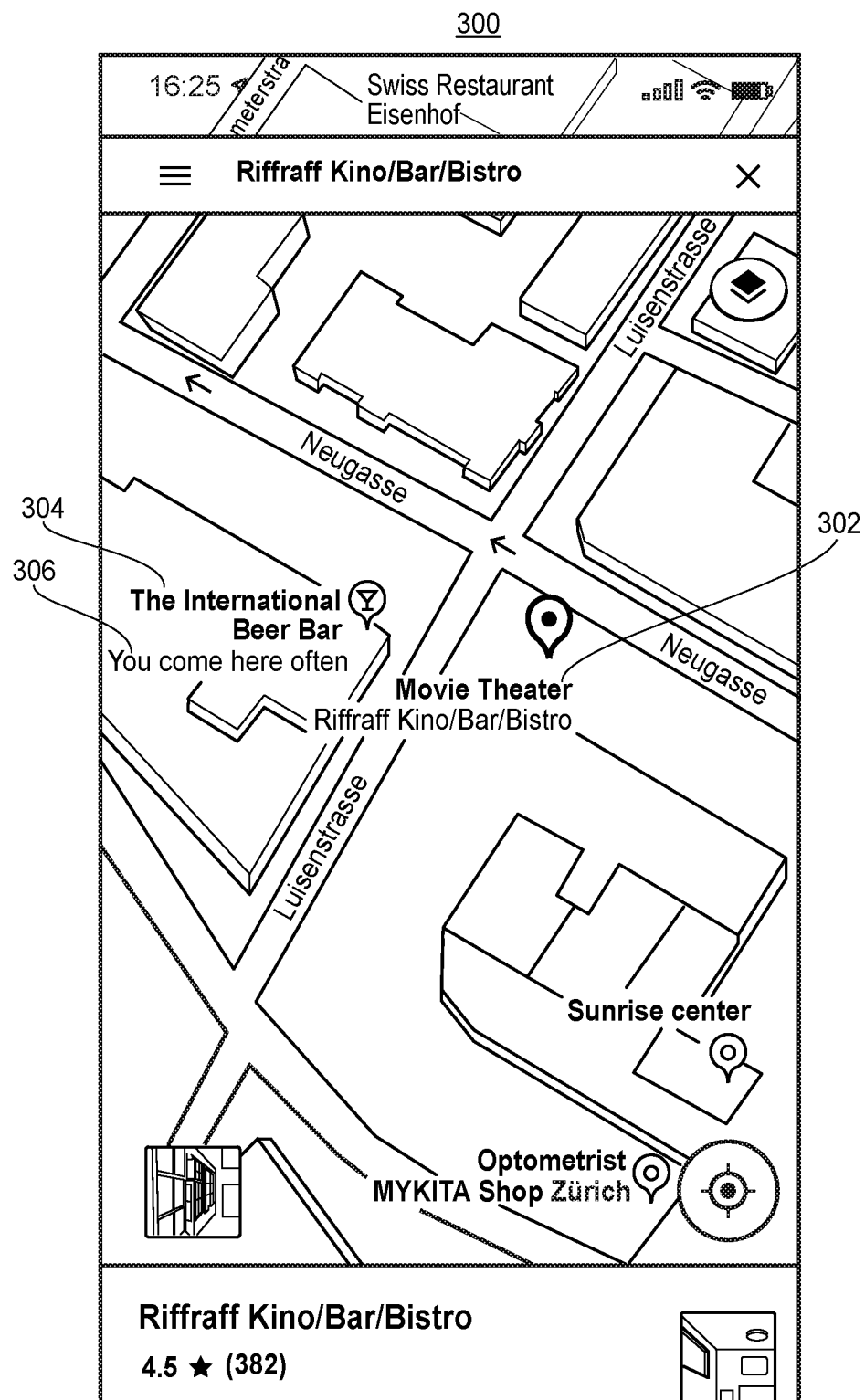
FIG. 3 is an example map display including a location selected by a user along with a landmark familiar to the user for providing a frame of reference for the selected location.

As described above, a user may select a location in the mapping application 22 operating on the client computing device 10. For example, the user may touch-select a location presented on the map display by the personalized data display 24, may touch-select a search suggestion or search result presented by the mapping application 22, may input the address or name of a particular location via user controls at the mapping application 22, or may select the location in any other suitable manner. The personalized data display 24 may then provide the selected location to the server device 60 with a request for map data for a geographic area surrounding the location. In response, the server device 60 generates the map data, and selects a familiar landmark within a threshold distance of the selected location to be presented as a frame of reference for the selected location to orient the user within the map display. Then the server device 60 provides the map data, the selected landmark, and information about the selected landmark such as a description of the relationship between the selected landmark and the user to the client computing device 10 to be presented by the personalized data display 24. FIG. 3 illustrates an example map display 300 including a location 302 selected by a user, Riffraff Kino/Bar/Bistro. The selected location 302 is presented with an indicator such as a pin or may be presented with any other suitable icon. In the example map display 300, the location 302 is selected by entering the name of the location, Riffraff Kino/Bar/Bistro, into a search bar. However, the location 302 may be selected in any other suitable manner, such as by touch-selecting a location on the map display 300.

The example map display 300 also includes a landmark 304 familiar to the user, The International Beer Bar, with an indicator such as a pin or other icon. Moreover, the map display 300 includes an annotation 306 describing the relationship between the familiar landmark 304 and the user, "You come here often." In some embodiments, the map data for the geographic area surrounding the selected location 302, the familiar landmark 304, and the annotation are provided to the client computing device 10 from the server device, and more specifically the personalized map data generator 68. For example, in another map display (not shown), the mapping application 22 prompts the user with a request to share location data, and a user control for selecting whether or not to share the location data. If the user selects the user control to share location data, the personalized map data generator 68 receives location data from the client computing device 10, as described above.

In response to the request for map data for a geographic area surrounding the selected location 302, the personalized map data generator 68 identifies locations in the location data that are within a threshold distance of the selected location 302 (e.g., 50 m, 100 m, 200 m, 0.5 km, 1 km, etc.) as candidate landmarks. Then the personalized map data generator 68 obtains the overall scores 262 for the candidate landmarks and ranks the candidate landmarks according to the overall scores 262. The personalized map data generator 68 selects the highest ranking candidate landmark and generates a description of the relationship between the selected landmark and the user. For example, when the user has visited the selected landmark at least a threshold number of times, the personalized map data generator 68 generates the description, "You come here often." When the user last visited the selected landmark within a threshold number of days, the personalized map data generator 68 generates the description, "You were here X days ago," or "You were here last week." The personalized data display 24 then presents the map display 300 using the map data, the selected location 302, the familiar landmark 304, and the annotation 306. In this manner, the user may view the map display 300 and have at least an understanding of the area that includes the selected location based on the nearby familiar landmark. In some embodiments, the personalized map data generator 68 provides the location label 212 (e.g., "Home," "Work," "Bob's House") for the selected landmark to the personalized data display 24 rather than the location name 204, and the map display 300 is presented with the location label 212.

Example Search Results Display with Annotated Results for Familiar Locations

Figure 4:
FIG. 4 is an example search results display including search suggestions annotated with a description of the relationship between the search suggestion and the user.

In addition to presenting personalized map data with selected locations, the personalized map data generation system presents a search results display 400 as shown in FIG. 4 with an annotated result 402 corresponding to a familiar location, "Café Henrici." The rankings of the annotated results 402 may also be boosted based on familiarity. As shown in FIG. 4, the search results/suggestions are generated in response to a geographic search query, café, which may be a partial geographic search query. For example, the personalized data display 24 may receive the user input, "café," and provide the user input to the server device 60. Accordingly, the server device 60 communicates with the map data server 50 or another suitable server to retrieve geographic search results relevant to the geographic search query. In some embodiments, each of the retrieved geographic search results are within a threshold distance of the user's current location or within a threshold distance of the geographic area presented on the map display of the user's client computing device 10.

In any event, the server device 60 may obtain the geographic search results in a ranked order along with relevancy scores for each of the geographic search results. In the search results display 400, the search results include: Café des Musees, Café Henrici, Café Grumpy, Café Bistrot, Café de Paris, Café De La Paix, and Café dolce amaro. The personalized map data generator 68 then identifies locations 204 from the user's location history that are included in the search results, such as Café Henrici. Then the personalized map data generator 68 annotates the search results for locations included in the user's location history with a description of the relationship between the location and the user, such as "You were here last week" 404. In some embodiments, the personalized map data generator 68 adjusts the scoring/ranking of the search results for example, by boosting the rankings of search results for locations that have previously been visited by the user. For example, while Café Henrici is ranked second in the search results display 400, the initial rankings based on relevancy may rank Café Henrici fourth. However, based on the overall familiarity score 262 for Café Henrici and the relevancy score, the personalized map data generator 68 boosts Café Henrici up to second in the rankings. In some embodiments, for a search result included in the user's location history, the personalized map data generator 68 may include the location label 212 (e.g., "Home," "Work," "Bob's House") provided by the user in the search results rather than the name of the location 204. The re-ranked search results along with respective annotations are then transmitted to the user's client computing device 10, and the personalized data display 24 presents the search results display 400 on a user interface 32 of the client computing device 10.

Example Navigation Directions with Familiar Landmarks

Figure 5A:
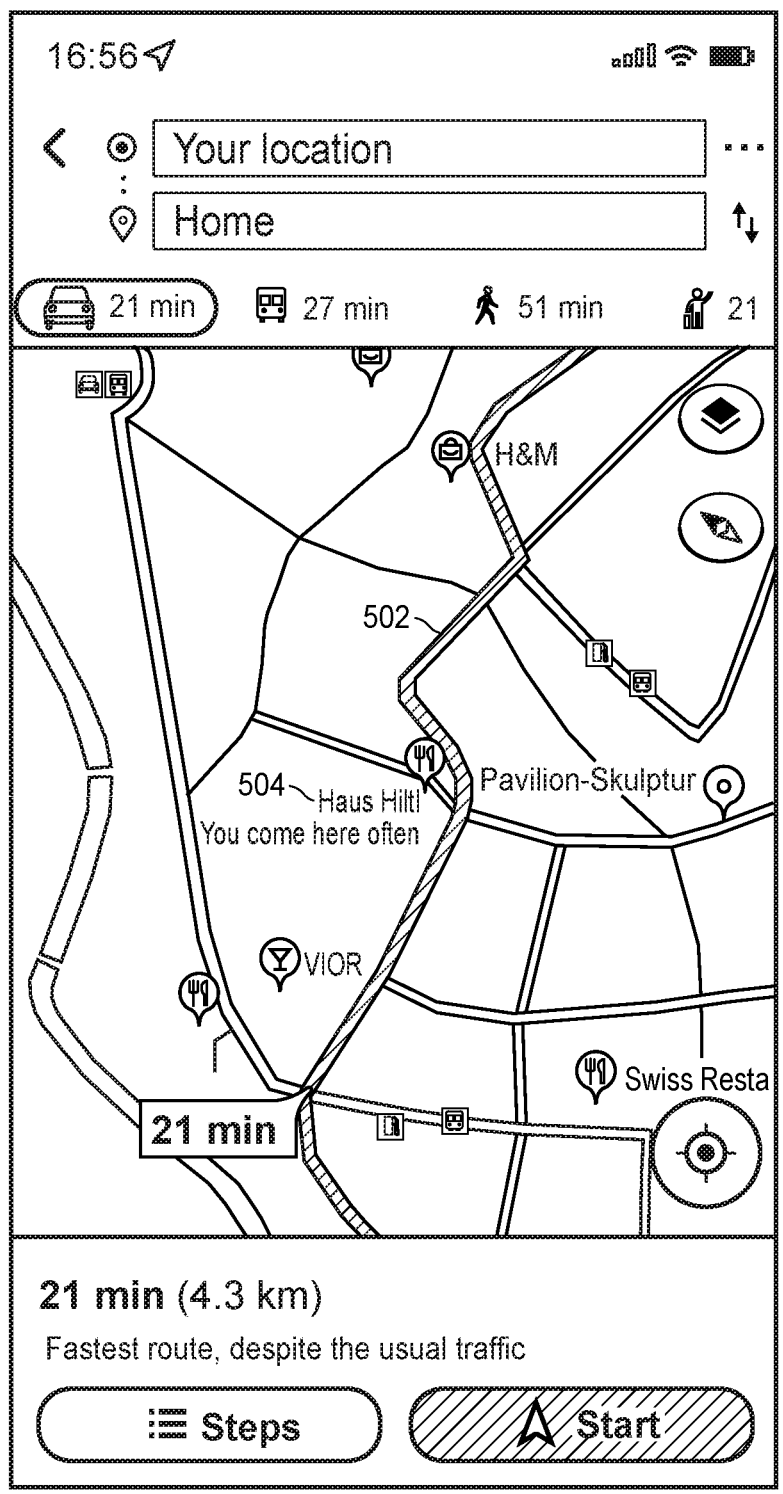
FIG. 5A is an example navigation display including a route to a destination with familiar landmarks presented along the route.

Furthermore, personalized map data is provided in navigation directions to guide the user with familiar landmarks. Using personalized map data also expands the dataset of landmarks to include those that are not well-known to the general public, but are specifically known to the user. This may include houses or apartment buildings of family members or close friends that the user frequently visits, office buildings of the user's current place of business or office buildings at which the user was previously employed, or other POIs familiar to the user, such as local businesses, bars, restaurants, etc. FIG. 5A illustrates an example navigation display 500 including a route 502 from the user's current location to a destination, "Home." The navigation display 500 may present a set of turn-by-turn navigation instructions each having a maneuver at a particular waypoint. For at least some of the maneuvers, the navigation display 500 includes a familiar landmark in the navigation instruction, such as "Haus Hiltl" 504 where the user frequently eats.

For example, the personalized data display 24 receives a request for navigation directions from a starting location (e.g., the user's current location) to a destination location (e.g., "Home") based on user input at the navigation display 500. The personalized data display 24 then transmits the request to the server device 60, which in turn, may forward the request to the navigation data server 34. In response to receiving a set of navigation instructions from the navigation data server 34, the personalized map data generator 68 replaces default navigation instructions with navigation instructions that include landmarks familiar to the user.

For example, as mentioned above, the personalized map data generator 68 identifies locations 204 in the location data table 200 as candidate landmarks that are within a threshold distance of each waypoint (e.g., within a threshold distance of an intersection for a maneuver) in the set of navigation instructions. Then the personalized map data generator 68 obtains the overall scores 262 for the candidate landmarks and ranks the candidate landmarks according to the overall scores 262. In some embodiments, when a candidate landmark is ranked above a threshold ranking or has a score above a threshold score, the personalized map data generator 68 selects the candidate landmark to include in the navigation instruction for the corresponding maneuver. For example, when the maneuver is to turn right at a waypoint within a threshold distance of Haus Hiltl, and Haus Hiltl has an overall score above a threshold score, the personalized map data generator 68 generates the instruction, "Turn right at the intersection past Haus Hiltl," or "Turn right at the intersection before Haus Hiltl." In some embodiments, the navigation instruction may include the location label 212 (e.g., "Home," "Work," "Bob's House") provided by the user rather than the name of the location 204. The set of personalized navigation instructions are then provided to the user's client computing device 10, and the personalized data display 24 presents the navigation display 500 on a user interface 32 of the client computing device 10.

Figure 5B:
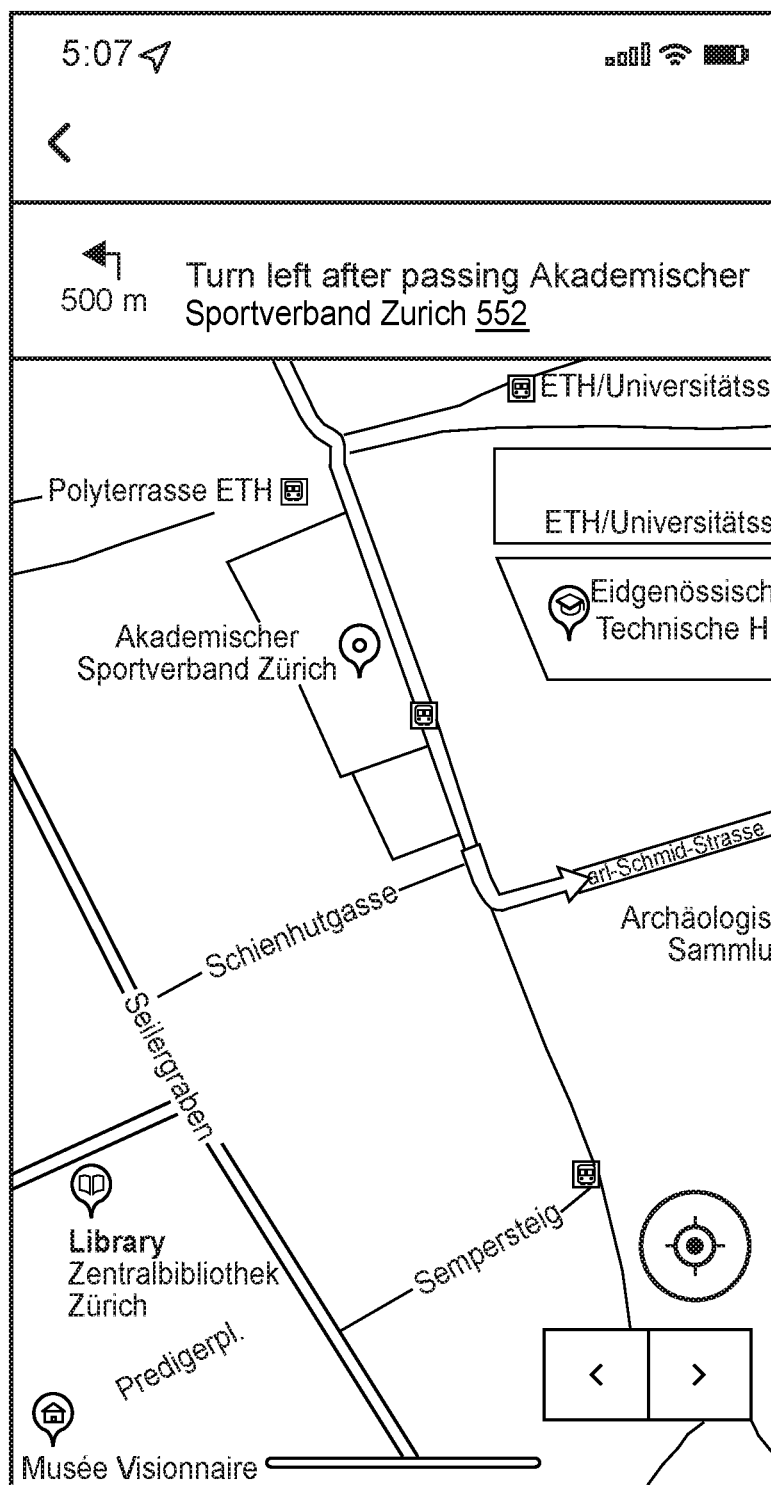
FIG. 5B is another example navigation display including a maneuver with a familiar landmark as a frame of reference for the maneuver.

FIG. 5B illustrates a detailed display 550 of a navigation instruction 552 presented as the user approaches the waypoint for the corresponding maneuver. As the user approaches Karl-Schmid Street, the personalized data display 24 presents a navigation instruction 552 to "Turn left after passing Akademischer Sportverband Zurich." As the user is very familiar with this sports academy based on her location history, she is likely to know when she has passed Akademischer Sportverband Zurich and where to turn left at the subsequent intersection. This may be more helpful than instructing the user to "Turn left onto Karl-Schmid Street," which may not have a visible street sign or which the user is unfamiliar with.

Example Navigation Directions with Familiar Landmark as Intermediate Destination In addition to including familiar landmarks in turn-by-turn navigation instructions, the personalized map data generator 68 also identifies a familiar landmark as an intermediate destination on the way to a final destination that is located away from the route from the starting location to the final destination. In this manner, the user is directed to travel to a familiar landmark which may get the user most of the way to the final destination with a single instruction. Then when the user approaches the intermediate destination or a waypoint along the way to the intermediate destination that is also a waypoint on the route to the final destination, the personalized map data generator 68 provides a set of navigation instructions to the final destination presented by the personalized data display 24 on the user's client computing device 10. This may reduce the number of navigation instructions that are provided to the user, and may allow the user to travel to an intermediate destination she is familiar with before additional guidance becomes necessary.

In an exemplary scenario, John requests navigation directions from his current location to University Hospital Zurich Foundation via the mapping application 22 of his client computing device 10. As shown in the example navigation display 600 of FIG. 6A, John's current location 602 is several kilometers north of University Hospital Zurich Foundation 604. The personalized data display 24 then transmits to the server device 60 the request for navigation directions from John's current location 602 to University Hospital Zurich Foundation 604. Accordingly, the personalized map data generator 68 may forward the request to the navigation data server 34, and may receive a set of navigation instructions from John's current location 602 to University Hospital Zurich Foundation 604, where each navigation instruction includes a maneuver at a corresponding waypoint.

Then the personalized map data generator 68 identifies locations in the user's location history as candidate intermediate destinations that are within a threshold distance of the University Hospital Zurich Foundation 604, within a threshold distance of one of the waypoints on the route from John's current location 602 to University Hospital Zurich Foundation 604, or where there is a common waypoint along a second route from the John's current location 602 to the candidate intermediate destination with one of the waypoints along the first route from John's current location 602 to University Hospital Zurich Foundation 604. In some embodiments, the candidate intermediate destinations are ranked based on their overall scores 262 from the data table 250 as shown in FIG. 2B. In other embodiments, the personalized map data generator 68 obtains the frequency 258 and recency 260 scores for the candidate intermediate destinations from the data table 250 as shown in FIG. 2B, and assigns a distance score to each candidate intermediate destination. The distance score may be based on the distance from the candidate intermediate destination to University Hospital Zurich Foundation 604, the distance to University Hospital Zurich Foundation 604 from the common waypoint along the route to the candidate intermediate destination, and/or a distance to the candidate intermediate destination from the nearest waypoint along the route from John's current location 602 to University Hospital Zurich Foundation 604.

Figure 6A:
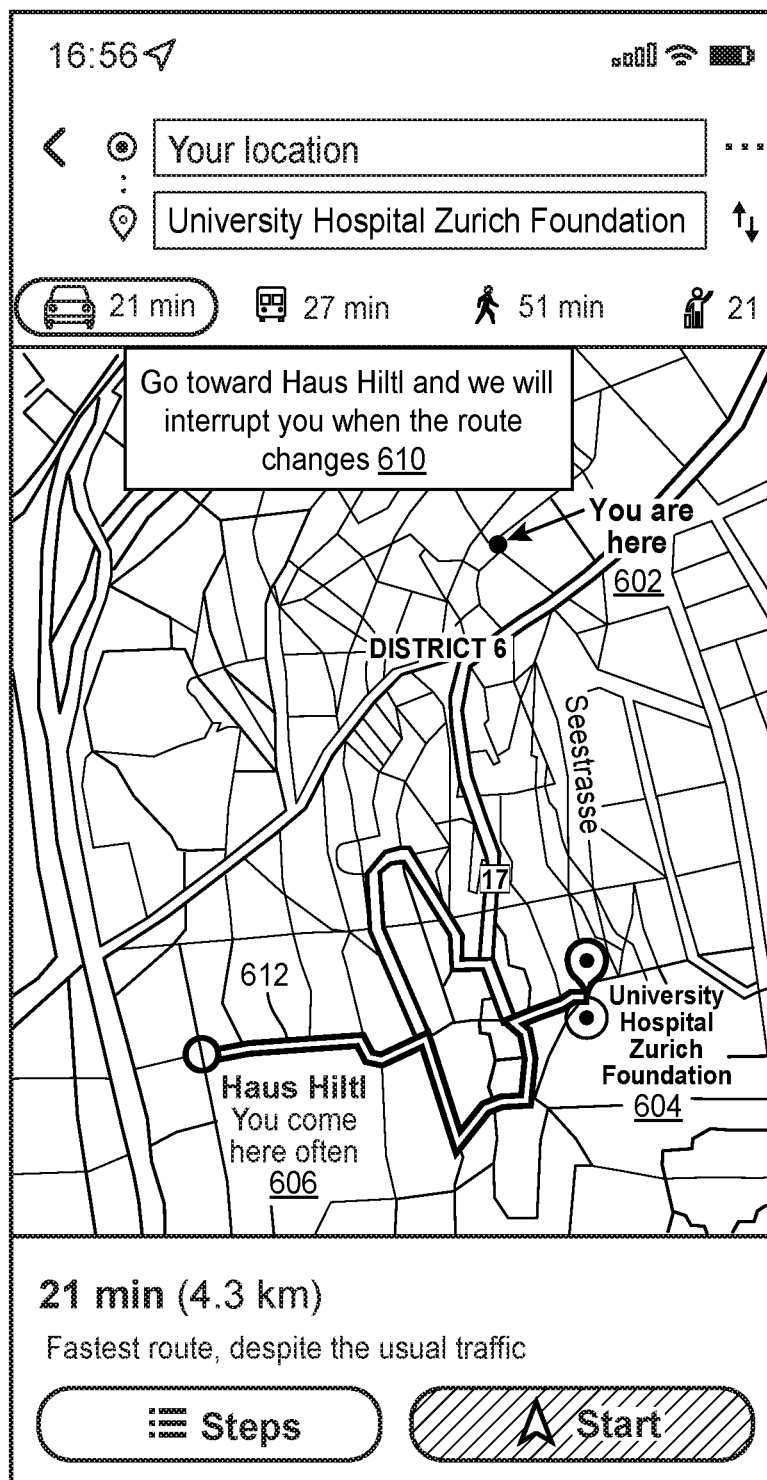
FIG. 6A is yet another navigation display provided in response to a request for navigation directions from the user's current location to a final destination, and including a first instruction to navigate to an intermediate destination along with a route from the intermediate destination to the final destination.

In any event, the personalized map data generator 68 combines the frequency 258, recency 260, and distance scores in any suitable manner to generate an intermediate destination score. Then the personalized map data generator 68 ranks the candidate intermediate destinations according to the intermediate destination scores and selects the highest ranking candidate intermediate destination as the intermediate destination. In this exemplary scenario, the personalized map data generator 68 selects Haus Hiltl 606 as the intermediate destination. As shown in FIG. 6A, Haus Hiltl 606, like University Hospital Zurich Foundation 604, is south of John's current location 602, and is closer to University Hospital Zurich Foundation 604 than John's current location 602. However, Haus Hiltl 606 is not on the route generated by the navigation data server 34 from John's current location 602 to University Hospital Zurich Foundation 604.

The personalized map data generator 68 then provides a first navigation instruction as a single instruction to travel toward Haus Hiltl 606 to the user's client computing device 10 for presentation via the personalized data display 24. In some embodiments, the first navigation instruction may include the location label 212 (e.g., "Home," "Work," "Bob's House") provided by the user for the intermediate destination rather than the name of the location 204. The personalized map data generator 68 also provides navigation directions to the user's client computing device 10 to University Hospital Zurich Foundation 604 from Haus Hiltl 606 or from a waypoint along the route to Haus Hiltl 606 that is in common with a waypoint along the route to University Hospital Zurich Foundation 604. Accordingly, the personalized data display 24 presents the first navigation instruction 610 in the navigation display 600. The personalized data display 24 also presents a highlighted representation of a route 612 from Haus Hiltl 606 to University Hospital Zurich Foundation 604. Because Haus Hiltl 606 is a familiar location to John, he can travel to Haus Hiltl 606 without any additional instructions, and as he approaches Haus Hiltl 606 or a common waypoint on the route to Haus Hiltl 606 and to University Hospital Zurich Foundation 604 (e.g., an exit off route 17), the personalized data display 24 may present turn-by-turn navigation instructions to University Hospital Zurich Foundation 604.

As shown in the navigation display 600, both a first route from John's current location 602 to Haus Hiltl 606 and a second route from John's current location 602 to University Hospital Zurich Foundation 604 appear to have a common waypoint at one of the exits off route 17. On the second route to University Hospital Zurich Foundation 604, the set of navigation instructions may include a maneuver to turn left off route 17 at a particular exit or street, whereas on the first route to Haus Hiltl 606, the set of navigation instructions may include a maneuver to turn right off route 17 at a particular exit or street or continue straight until reaching a further exit or street before turning right.

Figure 6B:
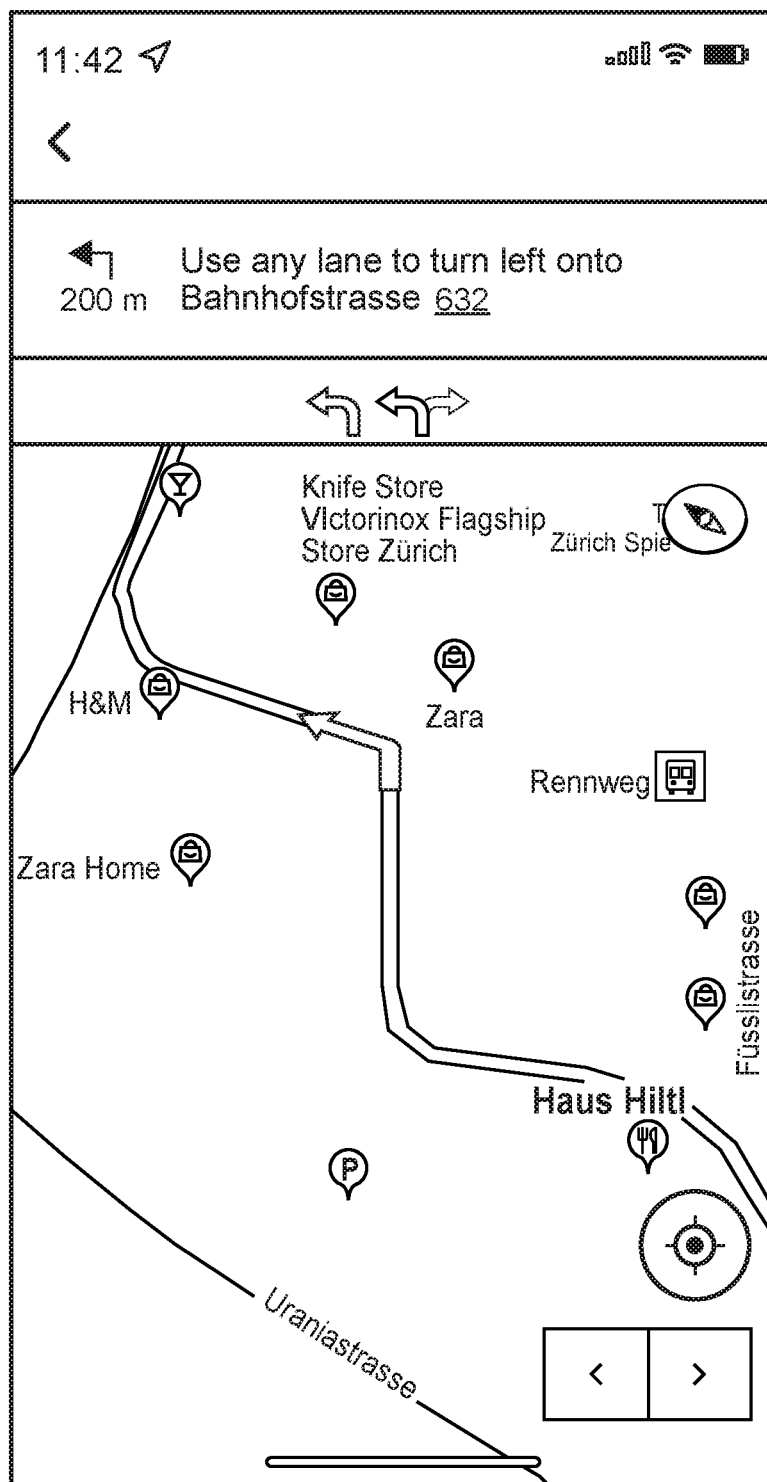
FIG. 6B is a detailed navigation display including a maneuver along the route presented in FIG. 6A from the intermediate destination to the final destination.

FIG. 6B illustrates a detailed navigation display 630 including a navigation instruction 632 presented when John approaches Haus Hiltl 606. For example, John's client computing device 10 may detect that John is approaching Haus Hiltl 606 via the sensors 19. In response to detecting that John is approaching Haus Hiltl 606, the personalized data display 24 may present turn-by-turn navigation instructions to University Hospital Zurich Foundation 604. As shown in the detailed navigation display 630, the navigation instruction 632 is one of a set of navigation instructions presented to John for directing John to University Hospital Zurich Foundation 604. When John completes the maneuver included in the navigation instruction 632, the detailed navigation display 630 presents another navigation instruction (not shown) on the highlighted route 634.

Instead of waiting for the user to arrive at the intermediate destination before providing turn-by-turn navigation instructions to the final destination, the personalized map data generator 68 may identify a common waypoint along the first and second routes to the intermediate destination and the final destination, respectively. In some embodiments, when there are multiple common waypoints, the personalized map data generator 68 may identify a last common waypoint along the first and second routes. For example, when both routes require the user to travel on Highway 1, and the route to the intermediate destination requires the user to turn right at exit 40, while the route to the final destination requires the user to continue straight until reaching exit 45 and then turn right, the personalized map data generator 68 may identify exit 40 as the last common waypoint. Then the personalized map data generator 68 may provide turn-by-turn navigation instructions from exit 40 to the final destination, which are presented by the personalized data display 24 before the user's client computing device reaches exit 40, so that the user does not make a right turn before viewing the navigation instruction to continue straight until exit 45.

Figure 6C:
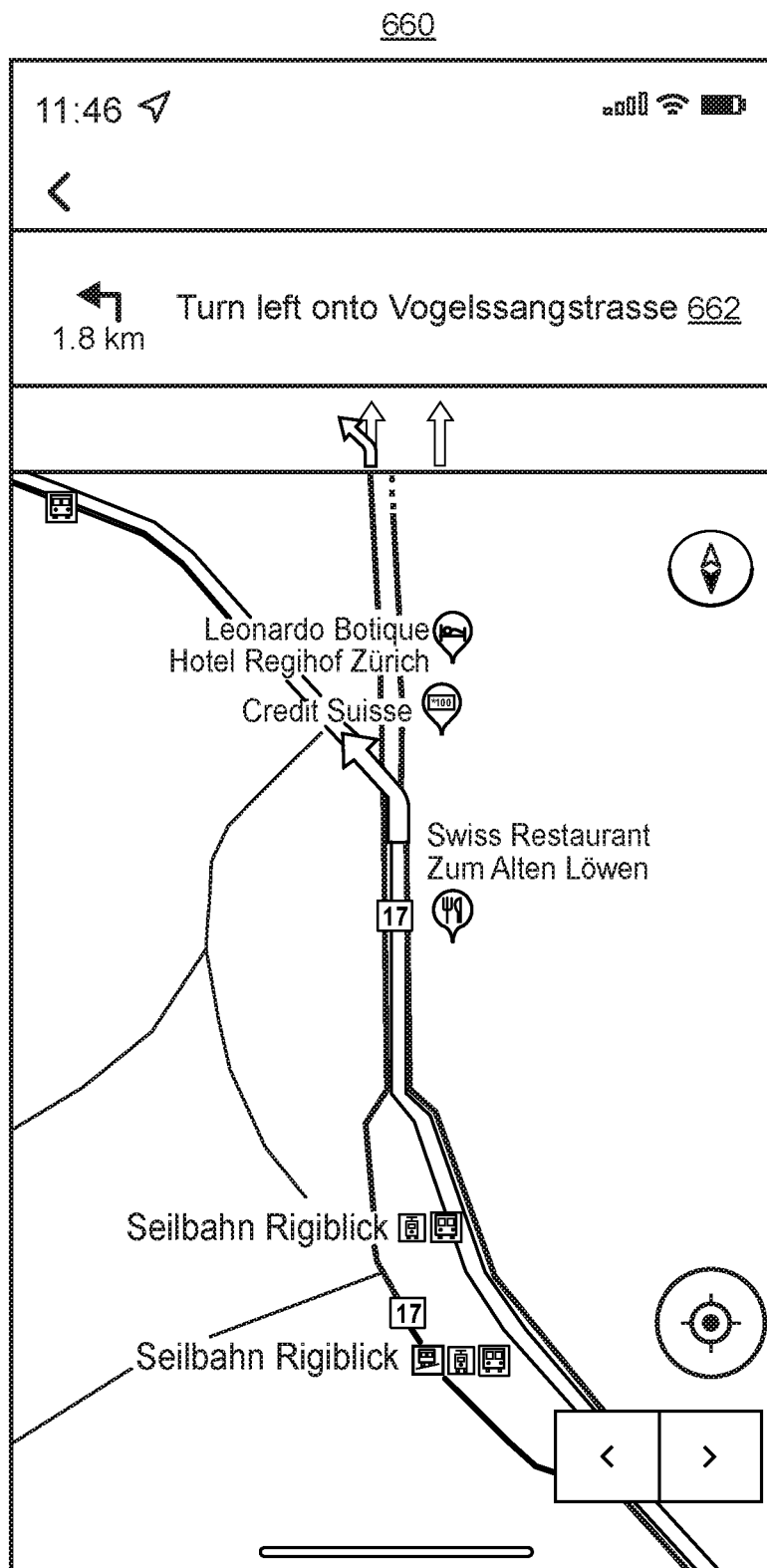
FIG. 6C is another detailed navigation display including a maneuver from a common waypoint along the routes to the intermediate destination and to the final destination presented in FIG. 6A.

FIG. 6C illustrates a detailed navigation display 660 including a navigation instruction 662 presented when the user approaches a common waypoint between the first route to Haus Hiltl 606 and the second route to University Hospital Zurich Foundation 604. As shown in the detailed navigation display 660, John is traveling south on route 17 based on the first navigation instruction 610 presented in the navigation display 600 as shown in FIG. 6A to travel toward Haus Hiltl 606. John's client computing device 10 may detect that he is approaching the last common waypoint between the first route to Haus Hiltl 606 and the second route to University Hospital Zurich Foundation 604. In response to detecting that John is approaching the last common waypoint, the personalized data display 24 may present turn-by-turn navigation instructions to University Hospital Zurich Foundation 604. This includes the navigation instruction 662 to turn left off of route 17 as opposed to turning right for navigating to Haus Hiltl 606.

In some scenarios, the intermediate destination is a familiar location to the user, but the starting location is unfamiliar. Thus, the user cannot navigate to the intermediate destination without detailed instructions. In some embodiments, the personalized data display 24 may provide a user control for the user to select whether or not to receive navigation directions that include an intermediate destination. If for example, the user feels comfortable navigating to a familiar intermediate destination from her current location, the user can request, via the user control, to receive navigation directions that include the intermediate destination. If the user does not feel comfortable navigating from her current location, she can request to receive turn-by-turn navigation instructions from her current location to the final destination without an intermediate destination.

In other embodiments, the personalized map data generator 68 determines whether or not to provide navigation directions that include an intermediate destination. For example, the personalized map data generator 68 may determine whether the user's current location or other starting location is a familiar location based on her location history. More specifically, if the overall score 262 for the starting location is above a threshold score, or the starting location is ranked above a threshold ranking based on the overall score 262, frequency score 258, or recency score 260, the personalized map data generator 68 may identify an intermediate destination, and provide turn-by-turn navigation instructions from the intermediate destination to the final destination. On the other hand, if the overall score 262 for the starting location is not above a threshold score, or the starting location is not ranked above a threshold ranking based on the overall score 262, frequency score 258, or recency score 260, the personalized map data generator 68 may provide turn-by-turn navigation instructions from the starting location to the final destination without an intermediate destination.

Also in some embodiments, the personalized map data generator 68 may identify multiple intermediate destinations on the way to the final destination. For example, the personalized map data generator 68 may provide a first navigation instruction to travel toward a first intermediate destination to the user's client computing device 10 for presentation via the personalized data display 24. The personalized map data generator 68 may also provide a second navigation instruction to travel toward a second intermediate destination closer to the final destination than the first intermediate destination. Moreover, the personalized map data generator 68 may provide navigation directions to the user's client computing device 10 to the final destination from the second intermediate destination or from a waypoint along the route to the second intermediate destination that is in common with a waypoint along the route to the final destination.

Accordingly, the personalized data display 24 may present the first navigation instruction in a navigation display. As the user's client computing device 10 approaches the first intermediate destination or a common waypoint on the route to the first intermediate destination and to the second intermediate destination, the personalized data display 24 may present the second navigation instruction in the navigation display. Then as the user's client computing device 10 approaches the second intermediate destination or a common waypoint on the route to the second intermediate destination and to the final destination, the personalized data display 24 may present the turn-by-turn navigation instructions to the final destination in the navigation display. While this example includes two intermediate destinations, this is merely one example for ease of illustration only. The personalized map data generator 68 may identify any number of intermediate destinations for directing the user on the way to the final destination.

Example Methods for Presenting Personalized Map Data

Figure 7:
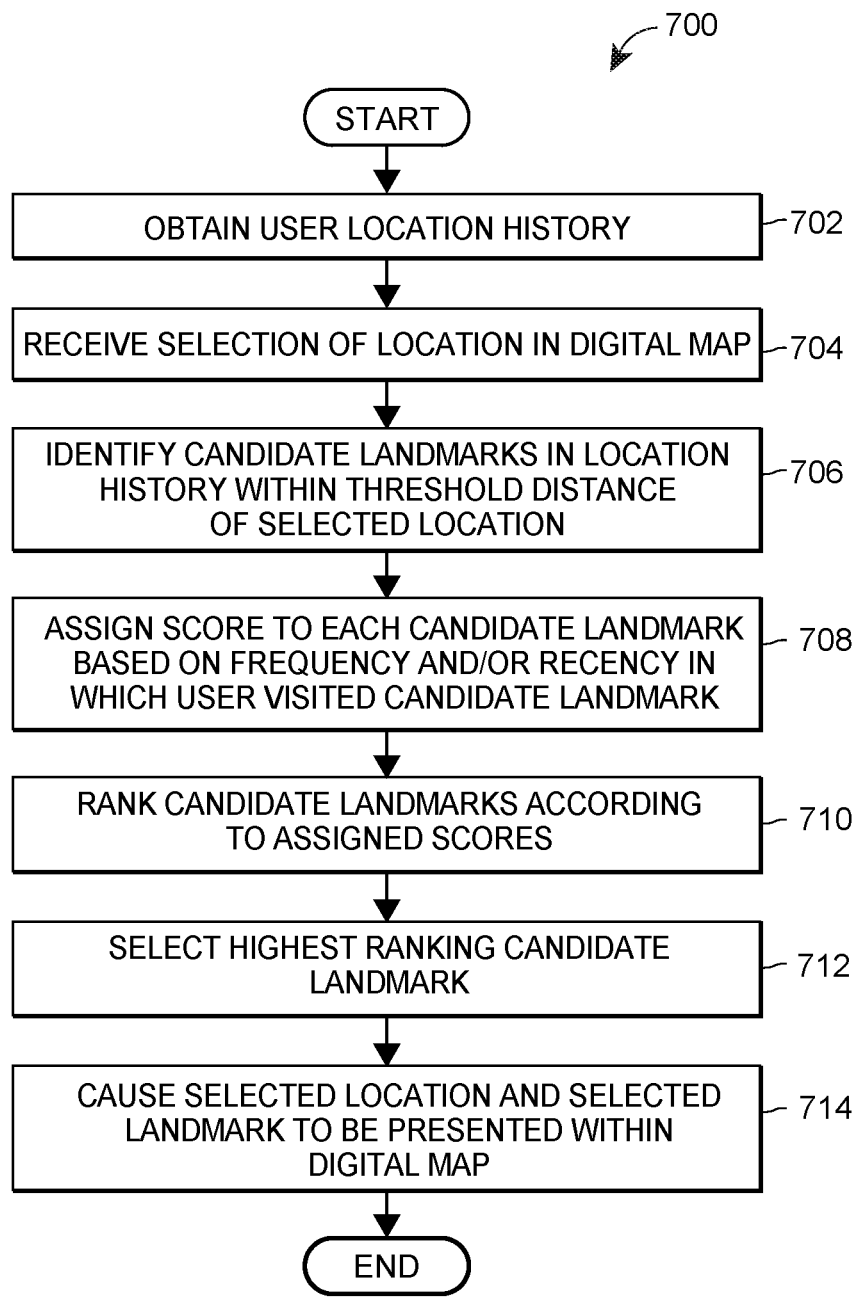
FIG. 7 is a flow diagram of an example method for providing a personalized landmark on a digital map to locate a geographic search result, which can be implemented in a computing device that operates in, or cooperates with, a personalized map data generation system.

FIG. 7 illustrates a flow diagram of an example method 700 for providing a personalized landmark on a digital map to locate a geographic search result. The method can be implemented in a set of instructions stored on a computer-readable memory and executable at one or more processors of the server device 60. For example, the method can be implemented by the personalized map data generator 68.

At block 702, location data is obtained for the user for example, from the personalized data display 24 operating in the client computing device 10. More specifically, the client computing device 10 may transmit location data to the personalized map data generator 68 when the user selects a user control providing permission to the mapping application 22 to share the location data. The location data may include the name or address of a location visited by a user according to a check-in at the location or positioning data from the sensors 19, the date and time at which the user visited the location, the amount of time in which the user visited the location, and/or a label for the location provided by the user, such as "Bob's House" for 123 Hauptstrasse in Zurich, Switzerland. In some embodiments, the personalized data display 24 provides location data when the client computing device 10 is at a location for more than a threshold time period (e.g., 1 minute).

Then at block 704, a location is selected in the mapping application 22 operating on the client computing device 10 and received at the server device 60 along with a request for map data for a geographic area surrounding the selected location. For example, the user may touch-select a location presented on the map display by the personalized data display 24, may touch-select a search suggestion or search result presented by the mapping application 22, may input the address or name of a particular location via user controls at the mapping application 22, or may select the location in any other suitable manner.

In response to the request, locations are identified in the user's location history as candidate landmarks that are within a threshold distance of the selected location 302 (e.g., 50 m, 100 m, 200 m, 0.5 km, 1 km, etc.) (block 706). Each of the candidate landmarks are scored according to frequency and recency to generate an overall score for the candidate landmarks, such as the overall scores 262 as shown in FIG. 2B. More specifically, the frequency score may be determined based on the total number of times the user has visited the location, the number of times the user has visited the location within a threshold time period (e.g., the previous month), the average rate in which the user visits the location (e.g., three times per month, twice a year, etc.), or in any other suitable manner. In some embodiments, the personalized map data generator 68 may factor the amount of time spent at the location into the frequency score, because the user may be more familiar with a location that she spent significant time in compared with a location she left quickly. For example, the frequency score may be determined based on a weighted number of times the user has visited the location, where visits are assigned higher weights the longer the user stays at the location.

The recency score may be determined based on the amount of time since the user last visited the location or the amount of time since the user visited the location at a rate above a frequency threshold. For example, if the user previously visited the location once a week for several months but now only visits the location once a year, the recency score may be based on the amount of time since the user last visited the location once a week. In some embodiments, the personalized map data generator 68 may factor the amount of time spent at the location into the recency score.

The overall score may then be determined based on any suitable combination of the frequency and recency scores. At block 710, the candidate landmarks are ranked according to their respective scores, and the personalized map data generator 68 selects the highest ranking candidate landmark to present in the map display (block 712).

Then the personalized map data generator 68 provides the map data including an indication of the selected location and an indication of the selected landmark to the user's client computing device 10 for presentation via the personalized data display 24 (block 714). In response, the personalized data display 24 presents a map display of a geographic area including the selected location and the selected landmark along with indications of the selected location and the selected landmark, such as pins or other icons representing the selected location and the selected landmark. In some embodiments, the personalized map data generator 68 generates a description of the relationship between the selected landmark and the user, such as a description of the frequency in which the user visited the landmark (e.g., "You come here often"), or a description of the recency in which the user visited the landmark (e.g., "You were here last week"). The personalized map data generator 68 then causes the map display to be annotated with the description of the relationship between the selected landmark and the user.

Figure 8:
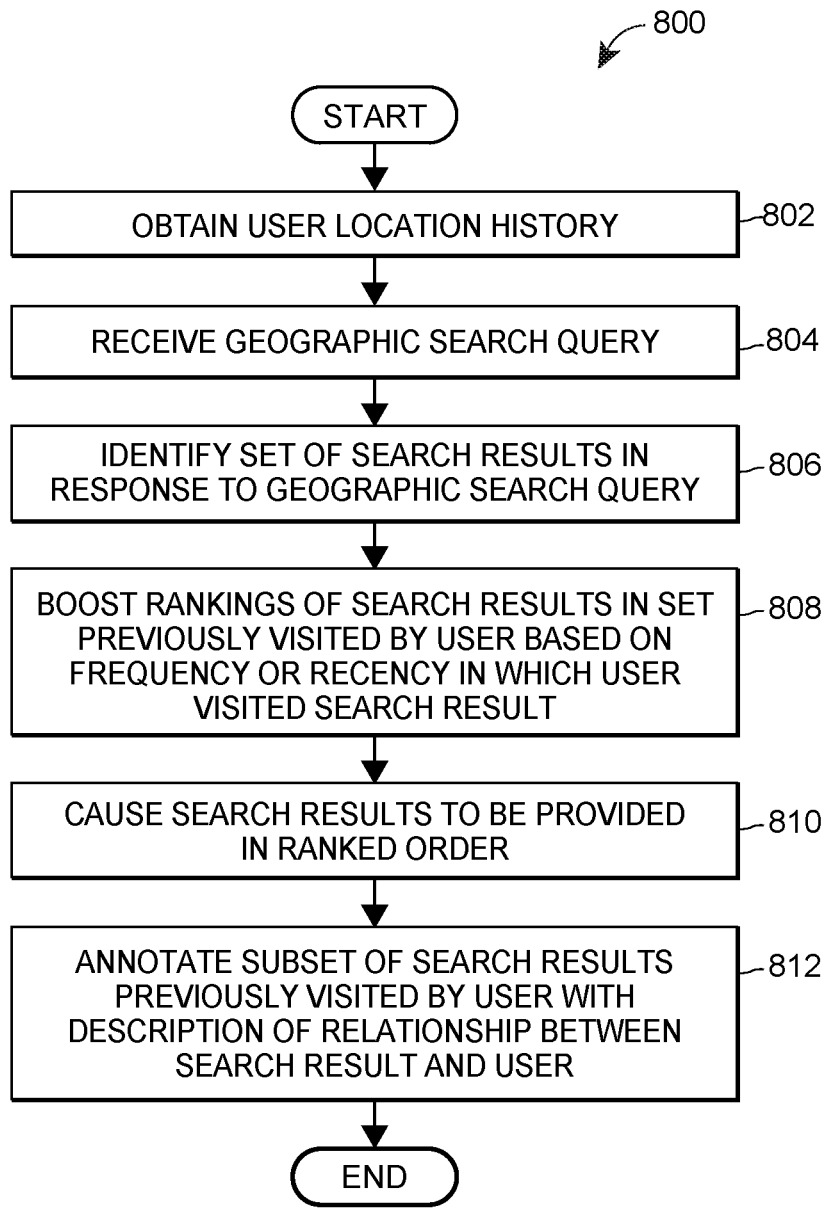
FIG. 8 is a flow diagram of an example method for providing navigation directions using personalized landmarks, which can be implemented in a computing device that operates in, or cooperates with, a personalized map data generation system.

FIG. 8 illustrates a flow diagram of an example method 800 for providing search suggestions based on familiarity to a user. The method can be implemented in a set of instructions stored on a computer-readable memory and executable at one or more processors of the server device 60. For example, the method can be implemented by the personalized map data generator 68.

At block 802, location data is obtained for the user for example, from the personalized data display 24 operating in the client computing device 10. More specifically, the client computing device 10 may transmit location data to the personalized map data generator 68 when the user selects a user control providing permission to the mapping application 22 to share the location data. The location data may include the name or address of a location visited by a user according to a check-in at the location or positioning data from the sensors 19, the date and time at which the user visited the location, the amount of time in which the user visited the location, and/or a label for the location provided by the user, such as "Bob's House" for 123 Hauptstrasse in Zurich, Switzerland. In some embodiments, the personalized data display 24 provides location data when the client computing device 10 is at a location for more than a threshold time period (e.g., 1 minute).

Then at block 804, a geographic search query is received which may be a partial geographic search query. For example, the personalized data display 24 may receive the user input, "café," and provide the user input to the server device 60. Accordingly, the server device 60 communicates with the map data server 50 or another suitable server to retrieve geographic search results/suggestions relevant to the geographic search query (block 806). In some embodiments, each of the retrieved geographic search results/suggestions are within a threshold distance of the user's current location or within a threshold distance of the geographic area presented on the map display of the user's client computing device 10.

In any event, the server device 60 may obtain the geographic search results/suggestions in a ranked order along with relevancy scores for each of the geographic search results/suggestions. In some embodiments, the personalized map data generator 68 adjusts the scoring/ranking of the search results/suggestions for example, by boosting the rankings of search results/suggestions for locations that have previously been visited by the user (block 808). More specifically, in addition to the relevancy scores, the personalized map data generator 68 obtains frequency scores 258, recency scores 260, and/or overall scores 262 (e.g., from the data table 250 depicted in FIG. 2B) for locations previously visited by the user. For locations that have not been previously visited by the user, the personalized map data generator 68 may assign a default overall score of 0 to the locations or another default score. In any event, for each search result/suggestion, the personalized map data generator 68 combines the relevancy score and the overall scores 262 to generate a boosted search result score. The personalized map data generator 68 then re-ranks the search results/suggestions according to the boosted search result scores, and provides the re-ranked search results/suggestions to the user's client computing device 10 for presentation via the personalized data display 24 (block 810).

In addition to re-ranking the search results/suggestions, the personalized map data generator 68 annotates the search results/suggestions for locations included in the user's location history with a description of the relationship between the location and the user, such as a description of the frequency in which the user visited the location (e.g., "You come here often"), or a description of the recency in which the user visited the location (e.g., "You were here last week"). The annotations are then provided to the user's client computing device 10 for presentation with the corresponding search results/suggestions via the personalized data display 24 (block 812).

Figure 9:
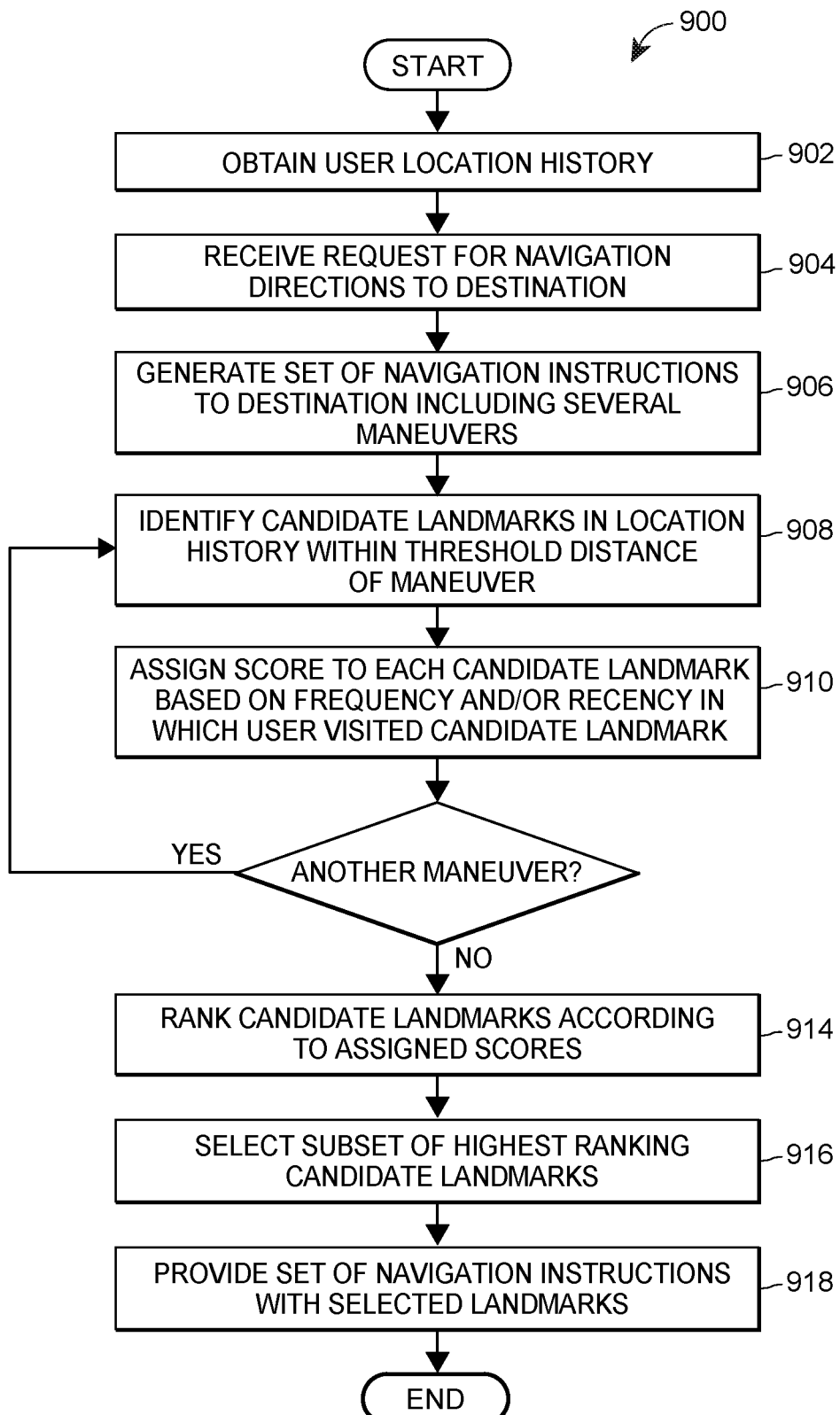
FIG. 9 is a flow diagram of an example method for providing search suggestions based on familiarity to a user, which can be implemented in a computing device that operates in, or cooperates with, a personalized map data generation system.

FIG. 9 illustrates a flow diagram of an example method 900 for providing navigation directions using personalized landmarks. The method can be implemented in a set of instructions stored on a computer-readable memory and executable at one or more processors of the server device 60. For example, the method can be implemented by the personalized map data generator 68.

At block 902, location data is obtained for the user for example, from the personalized data display 24 operating in the client computing device 10. More specifically, the client computing device 10 may transmit location data to the personalized map data generator 68 when the user selects a user control providing permission to the mapping application 22 to share the location data. The location data may include the name or address of a location visited by a user according to a check-in at the location or positioning data from the sensors 19, the date and time at which the user visited the location, the amount of time in which the user visited the location, and/or a label for the location provided by the user, such as "Bob's House" for 123 Hauptstrasse in Zurich, Switzerland. In some embodiments, the personalized data display 24 provides location data when the client computing device 10 is at a location for more than a threshold time period (e.g., 1 minute).

Then at block 904, a request is received for navigation directions from a starting location to a destination location. For example, the request may be transmitted from the client computing device 10 to the server device in response to user input provided at the client computing device 10. At block 906, a set of navigation instructions to the destination location may be generated, where each navigation instruction includes a maneuver at a particular waypoint along the route. In some embodiments, to generate the set of navigation instructions, the server device 60 forwards the request to the navigation data server 34 for navigation directions from the starting location to the destination location.

In response to receiving a set of navigation instructions from the navigation data server 34, the personalized map data generator 68 replaces default navigation instructions with navigation instructions that include landmarks familiar to the user. More specifically, locations are identified in the user's location history as candidate landmarks that are within a threshold distance of each waypoint in the set of navigation instructions (e.g., 50 m, 100 m, 200 m, 0.5 km, 1 km, etc.) (block 908). Then for each maneuver, the corresponding candidate landmarks are scored according to frequency and recency to generate an overall score for the candidate landmarks, such as the overall scores 262 as shown in FIG. 2B. More specifically, the frequency score may be determined based on the total number of times the user has visited the candidate landmark, the number of times the user has visited the candidate landmark within a threshold time period (e.g., the previous month), the average rate in which the user visits the candidate landmark (e.g., three times per month, twice a year, etc.), or in any other suitable manner. In some embodiments, the personalized map data generator 68 may factor the amount of time spent at the candidate landmark into the frequency score. For example, the frequency score may be determined based on a weighted number of times the user has visited the candidate landmark, where visits are assigned higher weights the longer the user stays at the candidate landmark.

The recency score may be determined based on the amount of time since the user last visited the candidate landmark or the amount of time since the user visited the candidate landmark at a rate above a frequency threshold. For example, if the user previously visited the candidate landmark once a week for several months but now only visits the candidate landmark once a year, the recency score may be based on the amount of time since the user last visited the candidate landmark once a week. In some embodiments, the personalized map data generator 68 may factor the amount of time spent at the candidate landmark into the recency score. The overall score may then be determined based on any suitable combination of the frequency and recency scores (block 910). This process is then repeated for each maneuver in the set of navigation instructions (block 912).

Then the personalized map data generator 68 obtains the overall scores for the candidate landmarks and ranks the candidate landmarks according to the overall scores (block 914). In some embodiments, when a candidate landmark is ranked above a threshold ranking or has a score above a threshold score, the personalized map data generator 68 selects the candidate landmark to include in the navigation instruction for the corresponding maneuver (block 916). In other embodiments, for each waypoint, the personalized map data generator 68 identifies candidate landmarks within a threshold distance of the particular waypoint, ranks the candidate landmarks corresponding to the particular waypoint, and selects the highest ranking candidate landmark for the particular waypoint to include in the navigation instruction.

In some scenarios, the personalized map data generator 68 only selects the highest ranking candidate landmark for the particular waypoint to include in the navigation instruction when the highest ranking candidate landmark has a minimum score above a threshold score. Otherwise, the personalized map data generator 68 uses the default navigation instruction, such as "Turn right onto Main St." In other scenarios, the personalized map data generator 68 selects a maximum threshold number of landmarks to include in the navigation instructions (e.g., 3). Accordingly, the personalized map data generator 68 selects the highest ranking candidate landmarks for different waypoints not to exceed the maximum threshold number.

The set of personalized navigation instructions are then provided to the user's client computing device 10 (block 918), and the personalized data display 24 presents the navigation display 500 on a user interface 32 of the client computing device 10.

Figure 10:
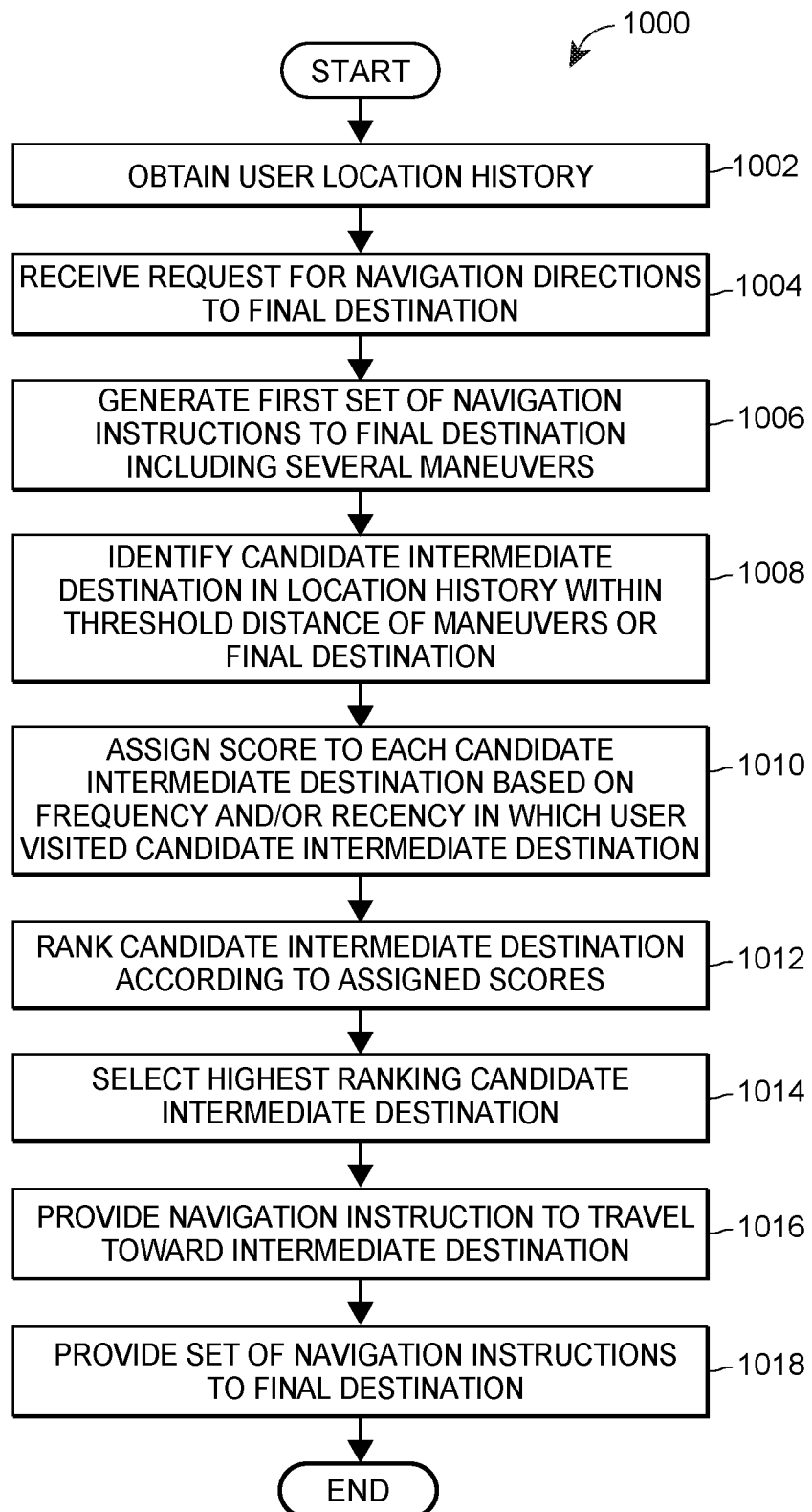
FIG. 10 is a flow diagram of an example method for providing navigation directions using a familiar location to a user as an intermediate destination, which can be implemented in a computing device that operates in, or cooperates with, a personalized map data generation system.

FIG. 10 illustrates a flow diagram of an example method 1000 for providing navigation directions using a familiar location to a user as an intermediate destination. The method can be implemented in a set of instructions stored on a computer-readable memory and executable at one or more processors of the server device 60. For example, the method can be implemented by the personalized map data generator 68.

At block 1002, location data is obtained for the user for example, from the personalized data display 24 operating in the client computing device 10. More specifically, the client computing device 10 may transmit location data to the personalized map data generator 68 when the user selects a user control providing permission to the mapping application 22 to share the location data. The location data may include the name or address of a location visited by a user according to a check-in at the location or positioning data from the sensors 19, the date and time at which the user visited the location, the amount of time in which the user visited the location, and/or a label for the location provided by the user, such as "Bob's House" for 123 Hauptstrasse in Zurich, Switzerland. In some embodiments, the personalized data display 24 provides location data when the client computing device 10 is at a location for more than a threshold time period (e.g., 1 minute).

Then at block 1004, a request is received for navigation directions from a starting location to a final destination location. For example, the request may be transmitted from the client computing device 10 to the server device 60 in response to user input provided at the client computing device 10. At block 1006, a first set of navigation instructions to the final destination location may be generated, where each navigation instruction includes a maneuver at a particular waypoint along the route. In some embodiments, to generate the first set of navigation instructions, the server device 60 forwards the request to the navigation data server 34 for navigation directions from the starting location to the final destination location.

The personalized map data generator 68 then identifies locations in the user's location history as candidate intermediate destination locations that are within a threshold distance of the final destination location, within a threshold distance of one of the waypoints on the first route from the starting location to the final destination location, or where there is a common waypoint along a second route from the starting location to the candidate intermediate destination with one of the waypoints along the first route (block 1008).

Then the candidate intermediate destinations are scored according to frequency and recency to generate an overall score for the candidate landmarks, such as the overall scores 262 as shown in FIG. 2B. More specifically, the frequency score may be determined based on the total number of times the user has visited the candidate landmark, the number of times the user has visited the candidate landmark within a threshold time period (e.g., the previous month), the average rate in which the user visits the candidate landmark (e.g., three times per month, twice a year, etc.), or in any other suitable manner. In some embodiments, the personalized map data generator 68 may factor the amount of time spent at the candidate landmark into the frequency score. For example, the frequency score may be determined based on a weighted number of times the user has visited the candidate landmark, where visits are assigned higher weights the longer the user stays at the candidate landmark.

The recency score may be determined based on the amount of time since the user last visited the candidate landmark or the amount of time since the user visited the candidate landmark at a rate above a frequency threshold. For example, if the user previously visited the candidate landmark once a week for several months but now only visits the candidate landmark once a year, the recency score may be based on the amount of time since the user last visited the candidate landmark once a week. In some embodiments, the personalized map data generator 68 may factor the amount of time spent at the candidate landmark into the recency score.

The candidate intermediate destinations may also be scored according to a distance score based on the distance from the candidate intermediate destination to the final destination, the distance to the final destination from the common waypoint along the route to the candidate intermediate destination, and/or a distance to the candidate intermediate destination from the nearest waypoint along the route from the starting location to the final destination. The personalized map data generator 68 combines the frequency 258, recency 260, and distance scores in any suitable manner to generate an intermediate destination score (block 1010). Then the personalized map data generator 68 ranks the candidate intermediate destinations according to the intermediate destination score (block 1012), and selects the highest ranking candidate intermediate destination (block 1014).

Accordingly, the personalized map data generator 68 provides a first navigation instruction for the user to travel to the selected intermediate destination to the user's client computing device 10 for presentation via the personalized data display 24 (block 1016). The first navigation instruction advantageously can omit specific steps such as "head south on Elm St.," "turn left onto Main St.," etc. Instead, the first navigation instruction can be simply "start driving toward the Music Box Theater," even if the intermediate destination, the Music Box Theater, is multiple maneuvers away from the current location. In some implementations, the first navigation instruction also mentions the point of divergence between the route to the intermediate destination and the final destination, e.g., "start driving toward the Music Box Theater but do not turn on Southport and continue straight." The personalized map data generator 68 also may obtain navigation directions to the final destination from the selected intermediate destination or from a waypoint along the route to the selected intermediate destination that is in common with a waypoint along the route to the final destination. Then the personalized map data generator 68 provides the navigation directions to the final destination to the user's client computing device 10 (block 1018). In turn, the personalized data display 24 presents the navigation directions to the final destination in response to determining, via the sensors 19, that the client computing device 10 is approaching the selected intermediate destination or the common waypoint along the route to the selected intermediate destination.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 700, 800, 900, and 1000 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 700, 800, 900, and 1000 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the methods 700, 800, 900, and 1000 can be utilized with other objects and user interfaces. Furthermore, although the explanation above describes steps of the methods 700, 800, 900, and 1000 being performed by specific devices (such as a server device 60), this is done for illustration purposes only. The blocks of the methods 700, 800, 900, and 1000 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing personalized map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing a personalized landmark on a digital map to locate a geographic search result, the method comprising:

receiving, at one or more processors, a selection of a point of interest within a digital map presented on a portable device of a user;

obtaining, by the one or more processors, a location history for the user indicative of locations the user visited for more than a threshold duration;

identifying, by the one or more processors, a plurality of candidate landmarks within a threshold distance of the selected point of interest;

selecting, by the one or more processors, one of the plurality of candidate landmarks for providing the user with a frame of reference for the selected point of interest by ranking the plurality of candidate landmarks based at least in part on a recency in which the user visited each candidate landmark based on an amount of time since the user most recently visited the candidate landmark according to the location history; and causing, by the one or more processors, an indicator representing the selected landmark and an indicator represented the selected point of interest to be presented within the digital map.

2. The method of claim 1, further comprising:

annotating, by the one or more processors, the digital map with a description of a relationship between the selected landmark and the user according to the location history.

3. The method of claim 2, wherein annotating the digital map with a description of a relationship between the selected landmark and the user includes at least one of:

annotating the digital map with an indication of a frequency in which the user has visited the selected landmark; or annotating the digital map with an indication of a most recent time in which the user has visited the selected landmark.

4. The method of claim 1, wherein selecting one of the plurality of candidate landmarks includes:

for each of the plurality of candidate landmarks, assigning, by the one or more processors, a score to the candidate landmark based on at least one of (i) a frequency in which the user has visited the candidate landmark or (ii) the amount of time since the user most recently visited the candidate landmark;

ranking, by the one or more processors, each of the plurality of candidate landmarks according to the respective scores; and selecting, by the one or more processors, a highest ranking candidate landmark.

5. The method of claim 4, wherein for each of the plurality of candidate landmarks assigning a score to the candidate landmark includes:

assigning, by the one or more processors, a frequency score to the candidate landmark based on an amount of times the user has visited the candidate landmark;

assigning, by the one or more processors, a recency score to the candidate landmark based on the amount of time since the user most recently visited the candidate landmark; and combining, by the one or more processors, the frequency and recency scores to generate an overall score for the candidate landmark.

6. The method of claim 5, wherein combining the frequency and recency scores includes assigning weights to each of the frequency and recency scores and combining the weighted frequency and recency scores.

7. A method for providing navigation directions using personalized landmarks, the method comprising:

receiving, at one or more processors, a request for navigation directions for a user of a portable device from a starting location to a destination location;

generating, by the one or more processors, a set of navigation instructions to the destination location, each navigation instruction in the set including a maneuver at a particular location, and for at least one navigation instruction in the set:

obtaining a location history for the user indicative of locations the user visited for more than a threshold duration;

selecting a navigation landmark within a threshold distance of the particular location for the maneuver for providing the user with a frame of reference for the maneuver, the navigation landmark selected by ranking a plurality of candidate landmarks based at least in part on a recency in which the user visited each candidate landmark based on an amount of time since the user most recently visited the candidate landmark according to the location history; and generating the navigation instruction referencing the selected navigation landmark; and causing, by the one or more processors, the set of navigation instructions to be provided via a user interface of the portable device.

8. The method of claim 7, wherein selecting a navigation landmark at least near the particular location for the maneuver includes:

for each of the plurality of candidate landmarks at least near the particular location for the maneuver, assigning, by the one or more processors, a score to the candidate landmark based on at least one of (i) a frequency in which the user has visited the candidate landmark or (ii) the amount of time since the user most recently visited the candidate landmark;

ranking, by the one or more processors, each of the plurality of candidate landmarks according to the respective scores; and selecting, by the one or more processors, a highest ranking candidate landmark.

9. The method of claim 8, wherein for each of the plurality of candidate landmarks assigning a score to the candidate landmark includes:

assigning, by the one or more processors, a frequency score to the candidate landmark based on an amount of times the user has visited the candidate landmark;

assigning, by the one or more processors, a recency score to the candidate landmark based on the amount of time since the user most recently visited the candidate landmark; and combining, by the one or more processors, the frequency and recency scores to generate an overall score for the candidate landmark.

10. The method of claim 9, wherein combining the frequency and recency scores includes assigning weights to each of the frequency and recency scores and combining the weighted frequency and recency scores.

11. The method of claim 7, wherein selecting a navigation landmark for at least one navigation instruction in the set includes:

for each navigation instruction in the set of navigation instructions:

identifying, by the one or more processors, a candidate landmark; and assigning, by the one or more processors, a score to the candidate landmark based on at least one of (i) a frequency in which the user has visited the candidate landmark or (ii) the amount of time since the user most recently visited the candidate landmark;

selecting, by the one or more processors, a subset of the candidate landmarks having scores above a threshold score; and for each navigation instruction associated with a selected landmark, generating the navigation instruction referencing the selected landmark.

12. The method of claim 7, wherein selecting a navigation landmark within the threshold distance of the particular location for the maneuver includes:

obtaining, by the one or more processors, indications of a plurality of points of interest previously visited by the user according to the location history;

identifying, by the one or more processors, a subset of the plurality of points of interest within the threshold distance of the particular location for the maneuver; and selecting, by the one or more processor, one of the subset of points of interest as the navigation landmark based on at least one of (i) a frequency in which the user has visited each of the points of interest in the subset or (ii) an amount of time since the user most recently visited each of the points of interest in the subset.

13. The method of claim 7, wherein selecting a navigation landmark within the threshold distance of the particular location for the maneuver includes selecting the navigation landmark within a threshold distance of an intersection for the maneuver.

14. A method for providing search suggestions based on familiarity to a user, the method comprising:

receiving, at one or more processors, a geographic search query from a user of a portable device;

obtaining, by the one or more processors, a location history for the user indicative of locations the user visited for more than a threshold duration;

identifying, by the one or more processors, a set of search results in response to the geographic search query, the set of search results including at least one point of interest that has previously been visited by the user according to the location history;

ranking, by the one or more processors, the set of search results based at least in part on a recency in which the user visited each search result according to the location history;

causing, by the one or more processors, the set of search results to be provided via a user interface of the portable device, wherein the set of search results are annotated with an indication of a frequency in which the user has visited the at least one point of interest, or an indication of a most recent time in which the user visited the at least one point of interest.

15. The method of claim 14, further comprising:

ranking, by the one or more processors, each of the search results in the set according to relevancy to the geographic search query;

boosting, by the one or more processors, rankings of search results in the set that have been previously visited by the user according to the location history; and causing, by the one or more processors, the set of search results to be provided in a ranked order via a user interface of the portable device.

16. The method of claim 15, wherein boosting rankings of search results in the set that have been previously visited by the user includes:

assigning, by the one or more processors, a score to each of the search results in the set according to relevancy to the geographic search query;

increasing, by the one or more processors, scores for search results in the set of search results corresponding to points of interest that have previously been visited by the user; and ranking, by the one or more processors, each of the search results in the set according to the scores.

17. The method of claim 15, wherein boosting, by the one or more processors, rankings of search results in the set that have been previously visited by the user according to the location history includes:

assigning, by the one or more processors, a first score to each of the search results in the set according to relevancy to the geographic search query;

assigning, by the one or more processors, a second score to each of the search results in the set according to an amount of times the user has visited a point of interest corresponding to the search result;

assigning, by the one or more processors, a third score to each of the search results in the set according to the recency in which the user visited each search result based on an amount of time since the user most recently visited the point of interest corresponding to the search result;

combining, by the one or more processors, the first, second, and third scores to generate an overall score for each of the search results in the set; and ranking, by the one or more processors, each of the search results in the set according to the overall scores.

18. The method of claim 14, wherein the geographic search query is a partial geographic search query and the set of search results are search suggestions in response to the partial geographic search query.

19. The method of claim 14, further comprising:

causing, by the one or more processors, indications of each of the search results to be presented in a digital map display.

* * * * *